United States Patent
Zhang et al.

(10) Patent No.: US 11,596,003 B2
(45) Date of Patent: Feb. 28, 2023

(54) OVERLAPPING RACH OCCASIONS AND MIXED MODE RACH RETRANSMISSION CONFIGURATIONS

(71) Applicant: QUALCOMM Incorporated, San Diego, CA (US)

(72) Inventors: Qian Zhang, Basking Ridge, NJ (US); Junyi Li, Chester, NJ (US); Navid Abedini, Somerset, NJ (US); Yan Zhou, San Diego, CA (US); Kapil Gulati, Belle Mead, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 148 days.

(21) Appl. No.: 17/102,217

(22) Filed: Nov. 23, 2020

(65) Prior Publication Data
US 2022/0167416 A1    May 26, 2022

(51) Int. Cl.
*H04W 74/08*  (2009.01)
*H04L 5/16*   (2006.01)
*H04L 1/08*   (2006.01)

(52) U.S. Cl.
CPC ........... *H04W 74/0833* (2013.01); *H04L 1/08* (2013.01); *H04L 5/16* (2013.01)

(58) Field of Classification Search
CPC ......... H04W 74/0833; H04L 5/16; H04L 1/08
See application file for complete search history.

(56) References Cited

U.S. PATENT DOCUMENTS

| 2014/0010178 | A1* | 1/2014  | Yu ...................... H04W 74/0833 |
|              |     |         | 370/329                                |
| 2017/0163404 | A1* | 6/2017  | Liu .................... H04W 72/0413  |
| 2019/0387546 | A1* | 12/2019 | Li ...................... H04L 27/26025 |
| 2020/0187264 | A1  | 6/2020  | Charbit et al.                         |
| 2020/0236716 | A1  | 7/2020  | Lei et al.                             |

(Continued)

FOREIGN PATENT DOCUMENTS

| CN | 103583064 A | 2/2014  |
|----|-------------|---------|
| CN | 108811160 A | 11/2018 |

(Continued)

OTHER PUBLICATIONS

International Search Report and Written Opinion—PCT/US2021/052992—ISA/EPO—dated Jan. 26, 2022.

*Primary Examiner* — Brenda H Pham
(74) *Attorney, Agent, or Firm* — Procopio, Cory, Hargreaves & Savitch LLP

(57) ABSTRACT

A UE may receive, from a base station/TRP, a configuration for a beam pair including an UL beam and a DL beam and transmit a RACH message via the UL beam while receiving DL information via the DL beam. The UE and/or the base station/TRP may be configured to operate in a FD mode. In aspects, the UE may transmit a RACH preamble based on a first mode of transmission. After a threshold time delay measured from the transmission of the RACH preamble, the UE may retransmit the RACH preamble based on a second mode of transmission. The second mode of transmission may be a same mode of transmission or a different mode of transmission from the first mode of transmission. Each mode of transmission may be based on one or more of TDM, FDM, or SDM.

26 Claims, 15 Drawing Sheets

(56) References Cited

U.S. PATENT DOCUMENTS

2021/0058971 A1 2/2021 Molavianjazi et al.
2022/0069884 A1* 3/2022 Zhang .................. H04B 17/318

FOREIGN PATENT DOCUMENTS

| EP | 2086277 A2 | 8/2009 |
| WO | 2019203930 A1 | 10/2019 |
| WO | 2020055041 A1 | 3/2020 |

* cited by examiner

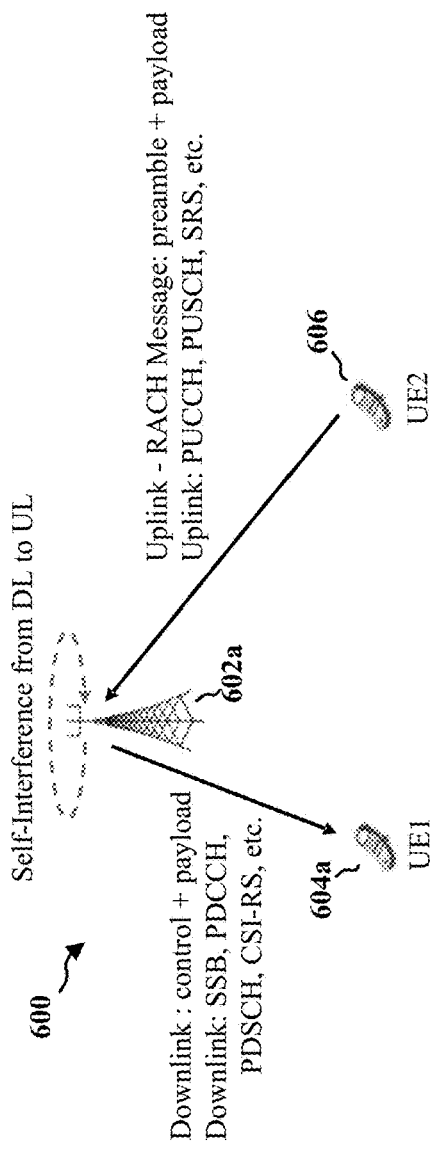
FIG. 6A
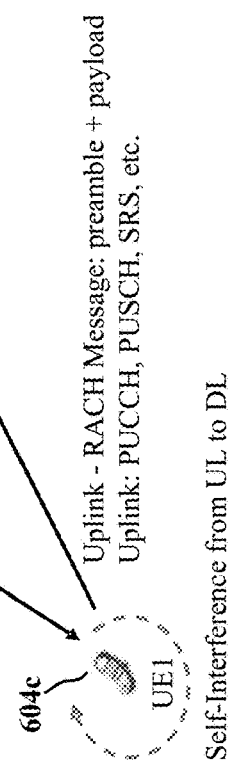
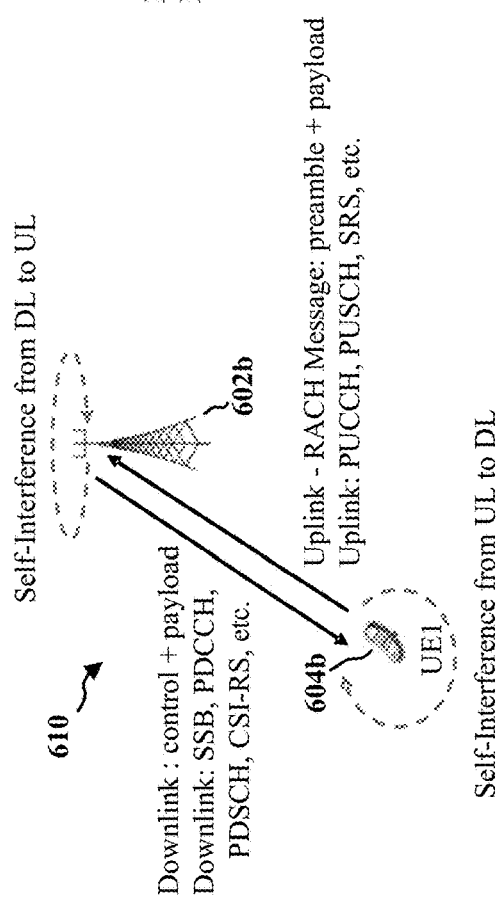
FIG. 6B
FIG. 6C

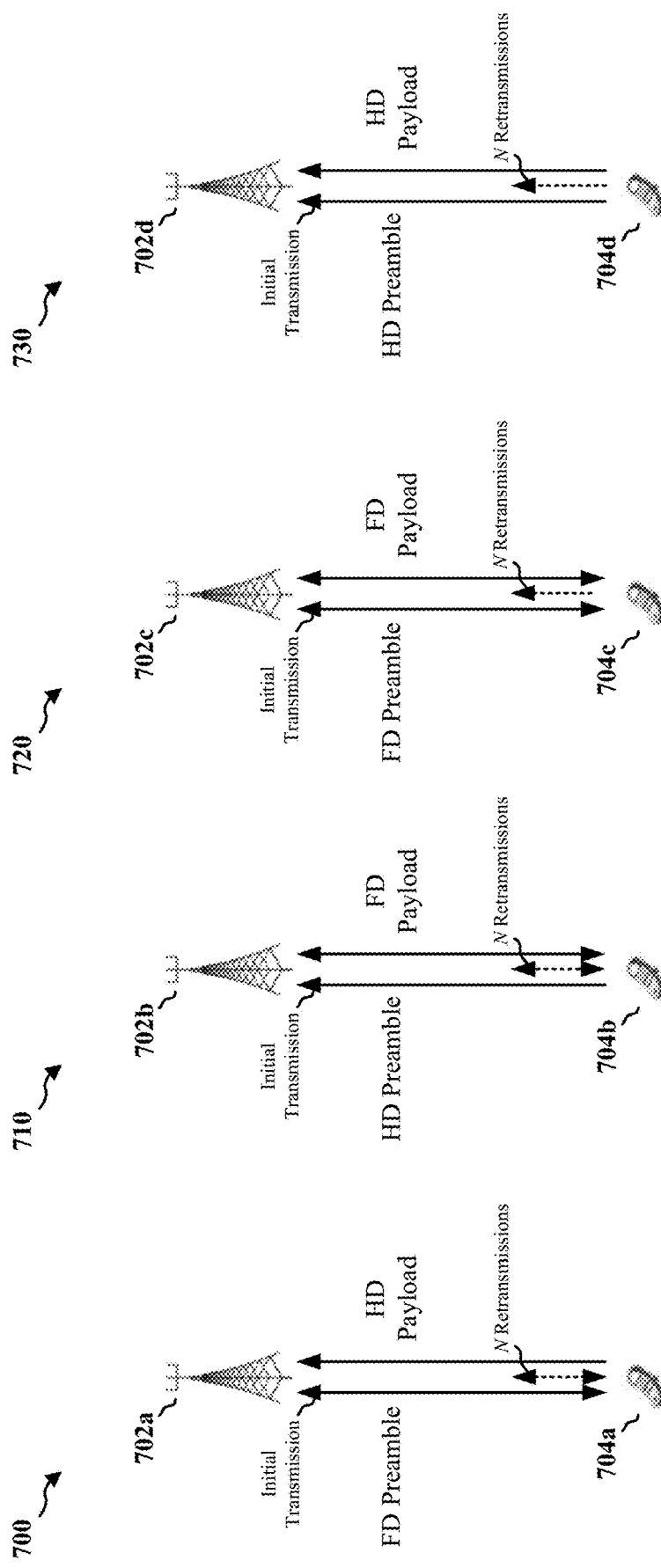

OVERLAPPING RACH OCCASIONS AND MIXED MODE RACH RETRANSMISSION CONFIGURATIONS

BACKGROUND

Technical Field

The present disclosure relates generally to communication systems, and more particularly, to overlapping random access channel (RACH) occasions and mixed mode RACH retransmission configurations.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include a memory and at least one processor coupled to the memory and configured to: receive, from at least one of a first base station or a first transmission-reception point (TRP), a configuration for a beam pair including an uplink (UL) beam and a downlink (DL) beam; and transmit at least one RACH message of a RACH procedure via the UL beam while receiving DL information via the DL beam, at least one of a user equipment (UE) or the at least one of the first base station or the first TRP operating in a full duplex (FD) mode.

In an aspect of the disclosure, a method, a computer-readable medium, and an apparatus are provided. The apparatus may include a memory and at least one processor coupled to the memory and configured to: transmit, to at least one of a first UE or a first TRP, a configuration for a beam pair including an UL beam and a DL beam; and receive at least one RACH message of a RACH procedure via the UL beam while transmitting DL information via the DL beam, at least one of a base station or the at least one of the first UE or the first TRP operating in a FD mode.

In an aspect of the disclosure, a method, a computer-readable medium, and an apparatus are provided. The apparatus may include a memory and at least one processor coupled to the memory and configured to: transmit a RACH preamble based on a first mode of transmission of a plurality of modes of transmission; determine to retransmit the RACH preamble based on a threshold time delay measured from the transmission of the RACH preamble; and retransmit the RACH preamble based on a second mode of transmission of the plurality of modes of transmission, the second mode of transmission being a same mode or a different mode of transmission from the first mode of transmission, each mode of transmission of the plurality of modes of transmission based on one or more of time division multiplexing (TDM), frequency division multiplexing (FDM), or spatial division multiplexing (SDM).

In an aspect of the disclosure, a method, a computer-readable medium, and an apparatus are provided. The apparatus may include a memory and at least one processor coupled to the memory and configured to: receive a transmission of a RACH preamble based on a first mode of transmission of a plurality of modes of transmission; and receive a retransmission of the RACH preamble based on a second mode of transmission of the plurality of modes of transmission, the second mode of transmission being a same mode or a different mode of transmission from the first mode of transmission, each mode of transmission of the plurality of modes of transmission based on one or more of TDM, FDM, or SDM.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 6A-6C illustrate diagrams for FD operations of a UE and a base station.

FIGS. 7A-7D illustrate diagrams for preamble/control portions of a RACH message and payload portions of the RACH message that are transmitted/retransmitted in FD and half-duplex (HD) modes.

DETAILED DESCRIPTION

Figure 1:
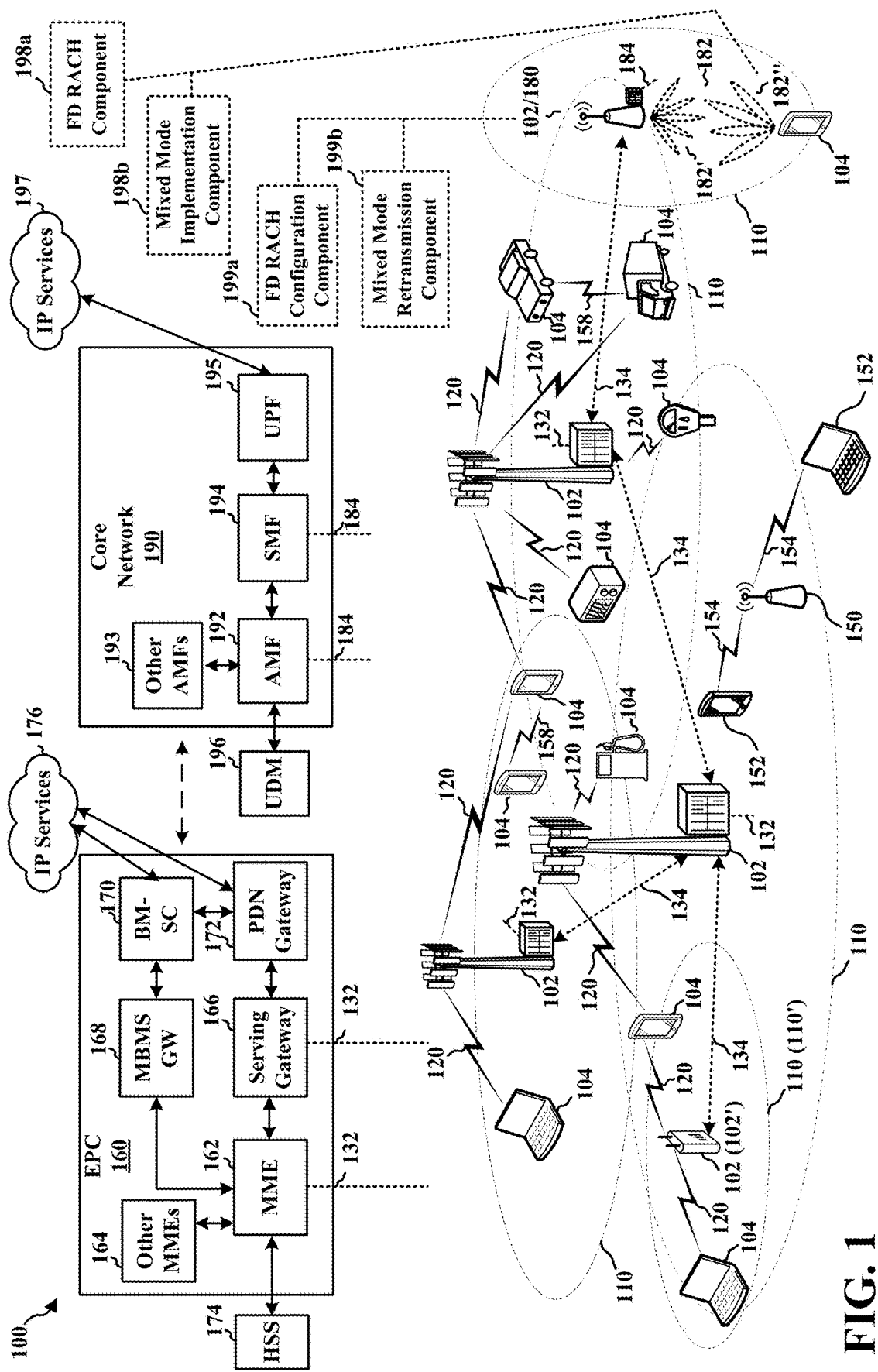
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMEs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmission-reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include a full duplex (FD) random access channel (RACH) determination component 198*a* configured to receive, from at least one of a first base station or a first TRP, a configuration for a beam pair including an UL beam and a downlink DL beam; and transmit at least one RACH message of a RACH procedure via the UL beam while receiving DL information via the DL beam, at least one of the UE or the at least one of the first base station or the first TRP operating in a FD mode. In certain aspects, the base station 180 may include a FD RACH configuration component 199*a* configured to transmit, to at least one of a first UE or a first TRP, a configuration for a beam pair including an UL beam and a DL beam; and receiving at least one RACH message of a RACH procedure via the UL beam while transmitting DL information via the DL beam, at least one of the base station or the at least one of the first UE or the first TRP operating in a FD mode. In certain aspects, the UE 104 may include a mixed mode implementation component 198*b* configured to transmit a RACH preamble based on a first mode of transmission of a plurality of modes of transmission; determine to retransmit the RACH preamble based on a threshold time delay measured from the transmission of the RACH preamble; and retransmit the RACH preamble based on a second mode of transmission of the plurality of modes of transmission, the second mode of transmission being a same mode or a different mode of transmission from the first mode of transmission, each mode of transmission of the plurality of modes of transmission based on one or more of time division multiplexing (TDM), frequency division multiplexing (FDM), or spatial division multiplexing (SDM). In certain aspects, the base station 180 may include a mixed mode retransmission component 199*b* configured to receive a transmission of a RACH preamble based on a first mode of transmission of a plurality of modes of transmission; and receive a retransmission of the RACH preamble based on a second mode of transmission of the plurality of modes of transmission, the second mode of transmission being a same mode or a different mode of transmission from the first mode of transmission, each mode of transmission of the plurality of modes of transmission based on one or more of TDM, FDM, or SDM. Although the following description may be focused on 5G NR, the concepts described herein may be applicable to other similar areas, such as LTE, LTE-A, CDMA, GSM, and other wireless technologies.

Figure 2:
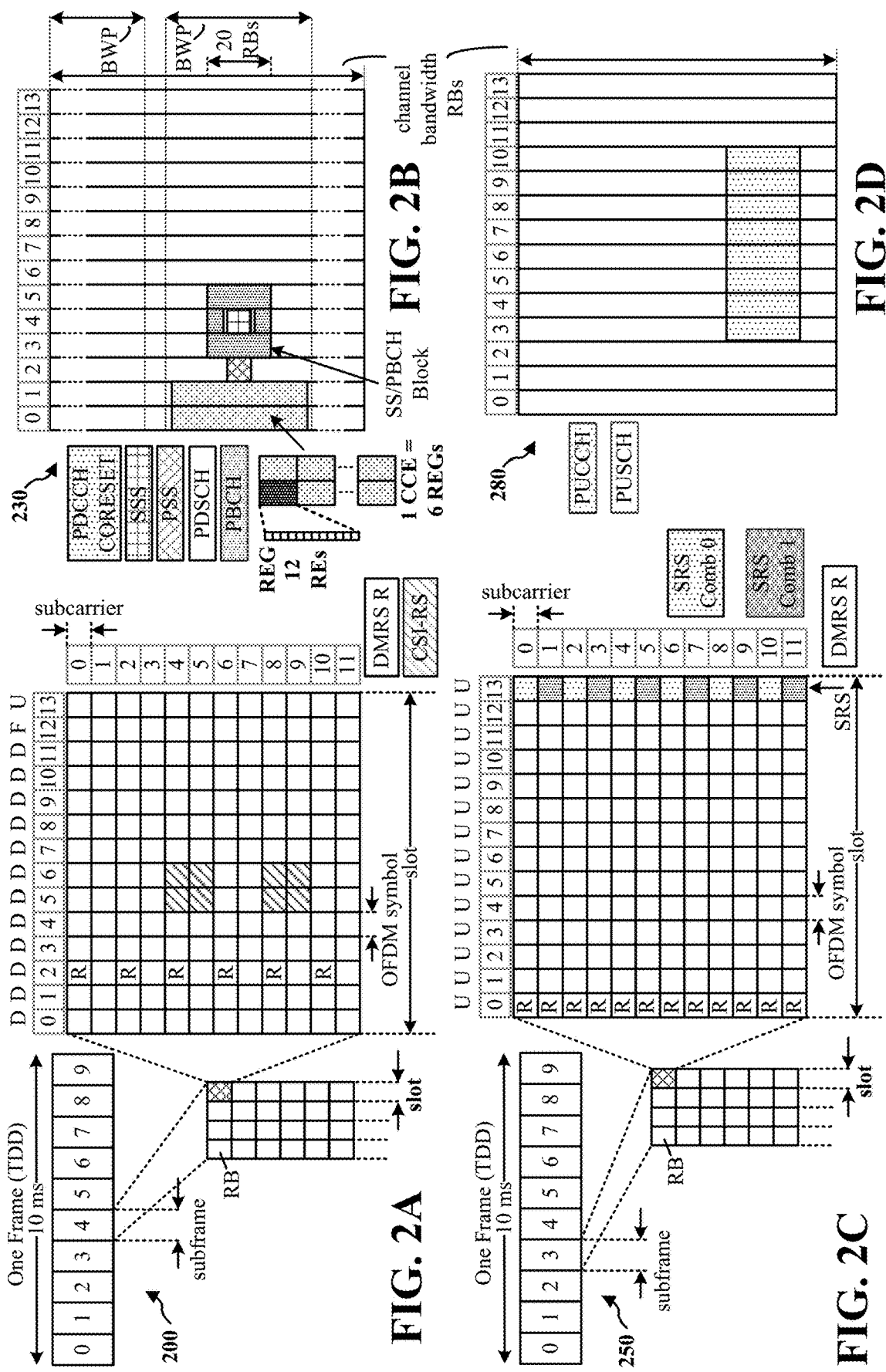
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
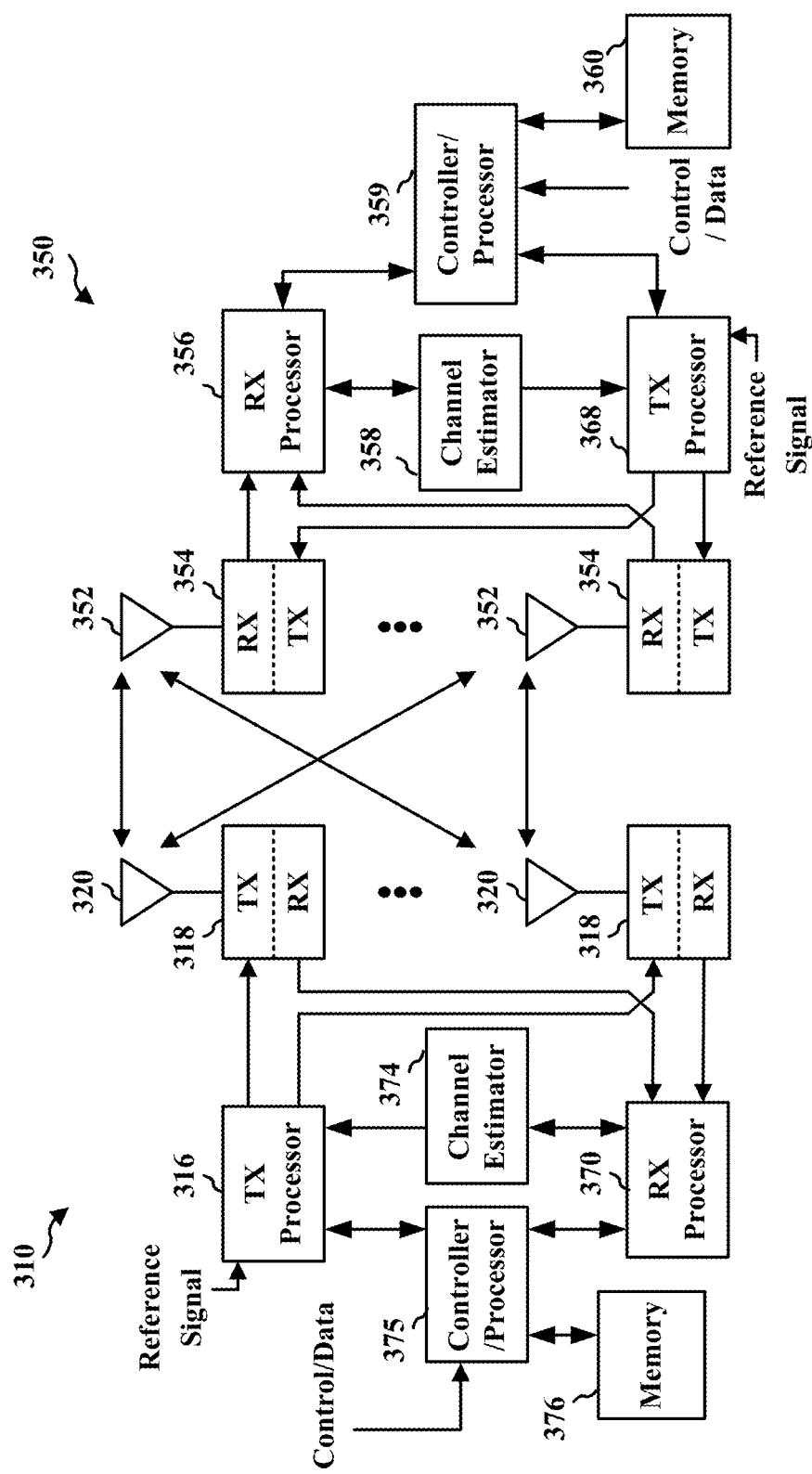
FIG. 3 is a diagram illustrating an example of a base station and UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198a and 198b of FIG. 1.

At least one of the TX processor 316, the RX processor 370, and the controller/processor 375 may be configured to perform aspects in connection with 199a and 199b of FIG. 1.

Wireless communication systems may be configured to share available system resources and provide various telecommunication services (e.g., telephony, video, data, messaging, broadcasts, etc.) based on multiple-access technologies such as CDMA systems, TDMA systems, FDMA systems, OFDMA systems, SC-FDMA systems, TD-SCDMA systems, etc. that support communication with multiple users. In many cases, common protocols that facilitate communications with wireless devices are adopted in various telecommunication standards. For example, communication methods associated with eMBB, mMTC, and URLLC may be incorporated in the 5G NR telecommunication standard, while other aspects may be incorporated in the 4G LTE standard. As mobile broadband technologies are part of a continuous evolution, further improvements in mobile broadband remain useful to continue the progression of such technologies.

Figure 4:
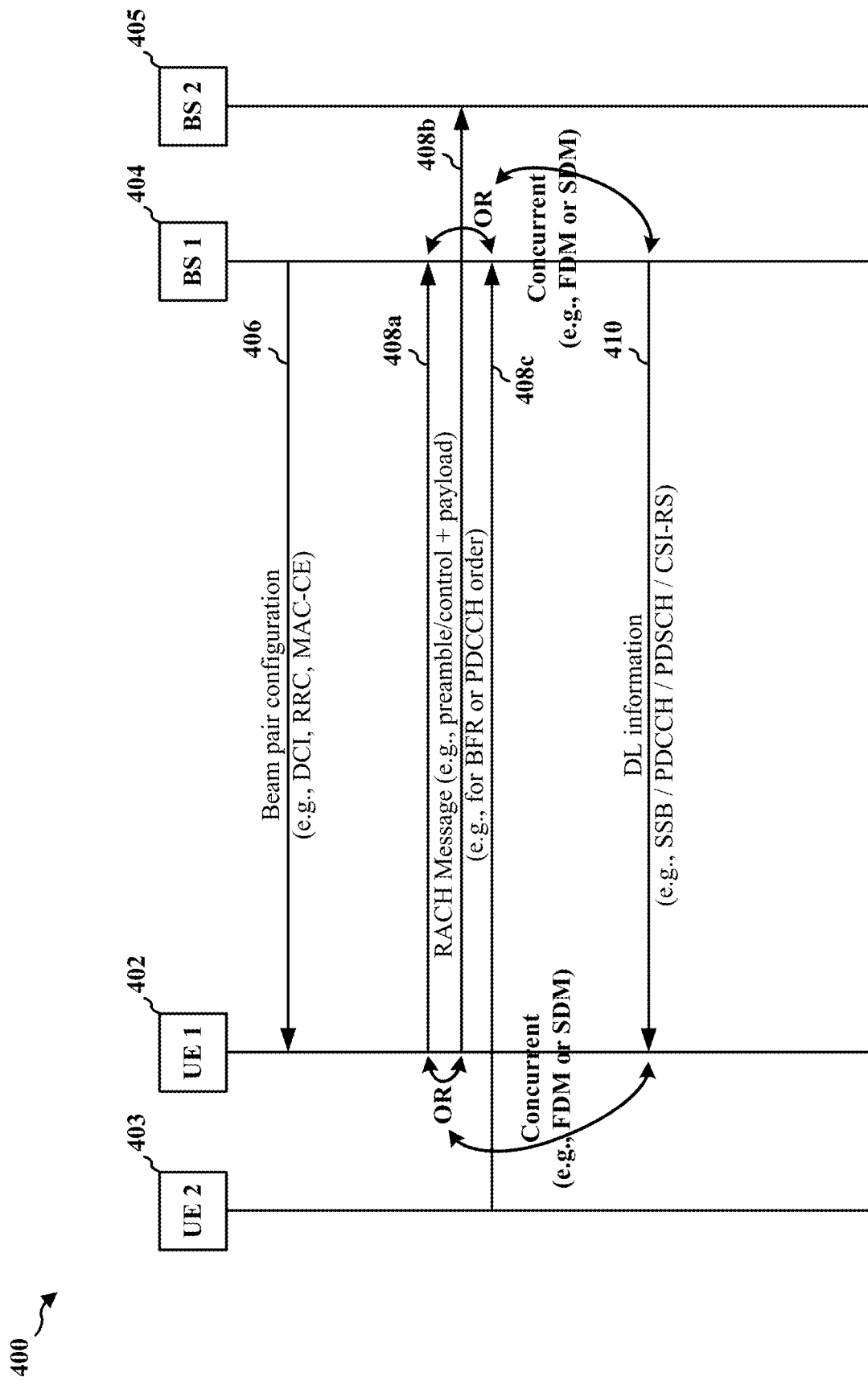
FIG. 4 is a call flow diagram illustrating communications between one or more UEs and one or more base stations.

FIG. 4 is a call flow diagram 400 illustrating communications between one or more UEs 402-403 and one or more base stations 404-405. At 406, a first base station 404 may transmit a beam pair configuration to a first UE 402. The beam pair configuration may be transmitted based on DCI, RRC signaling, or a medium access control-control element (MAC-CE).

The first UE 402 may transmit, at 408a or 408b, a RACH message to either the first base station 404 or the second base station 405. The RACH message transmitted by the first UE 402 may be for a beam failure recovery (BFR) or a PDCCH order for a timing advance (TA) and may include a preamble/control portion and a payload portion. The RACH message transmitted, at 408a or 408b, may be transmitted concurrently with receiving, at 410, DL information from the first base station 404. Thus, the RACH message and the DL information may be FDMed or SDMed. The DL information may correspond to a SSB, PDCCH, PDSCH, CSI-RS, etc.

The first base station 404 may receive, at 408a or 408c, a RACH message from either the first UE 402 or the second UE 403. The RACH message received by the first base station 404 may be for a BFR or a PDCCH order for a TA and may include a preamble/control portion and a payload portion. The RACH message received, at 408a or 408c, may be received concurrently with transmitting, at 410, the DL information to the first UE 402. Thus, the RACH message and the DL information may be FDMed or SDMed. The DL information may correspond to a SSB, PDCCH, PDSCH, CSI-RS, etc.

Figure 5:
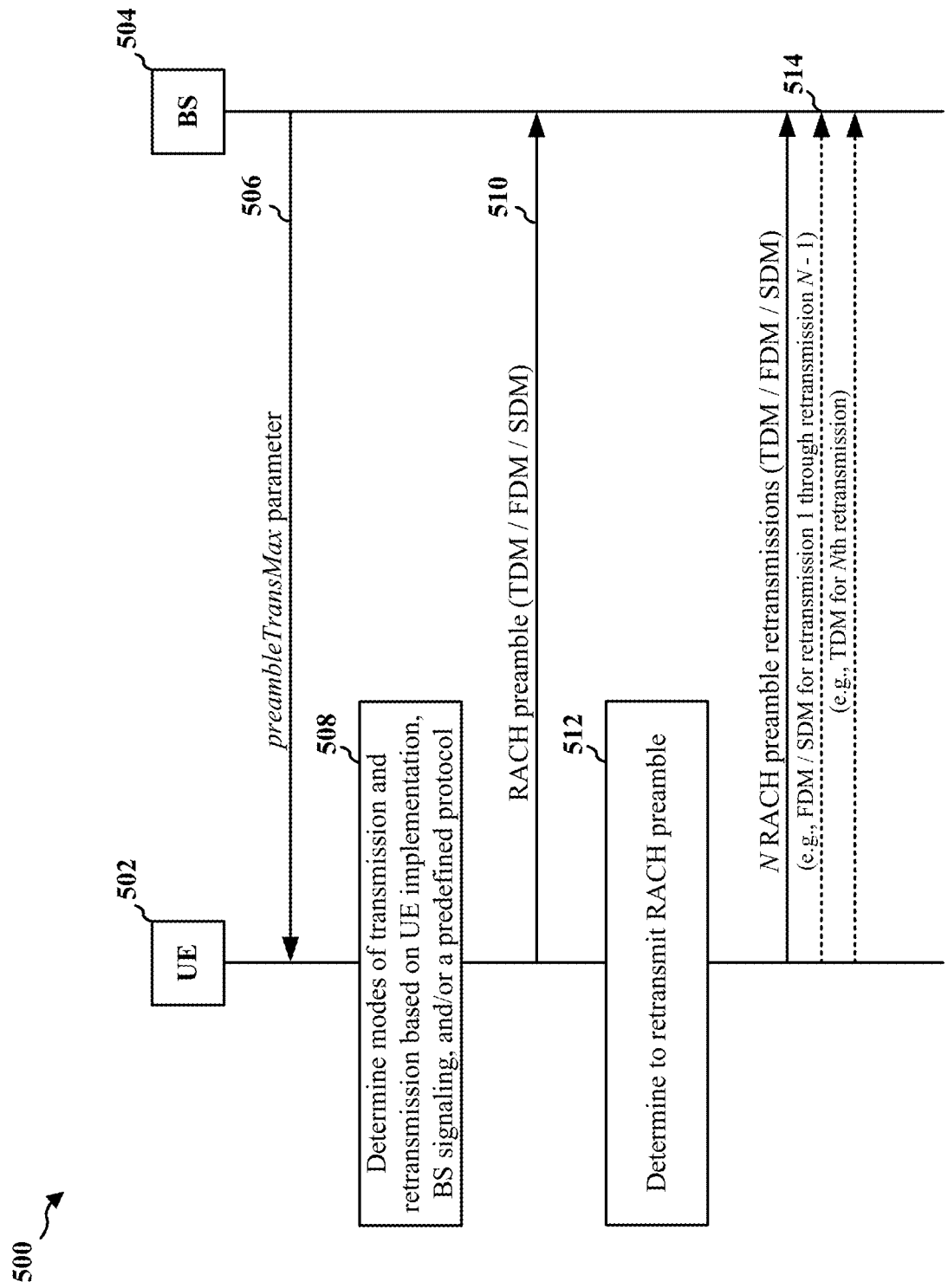
FIG. 5 is a call flow diagram illustrating communications between a UE and a base station.

FIG. 5 is a call flow diagram 500 illustrating communications between a UE 502 and a base station 504. At 506, the base station 504 may transmit a preambleTransMax parameter to the UE 502 indicative of a maximum number of RACH preamble transmissions/retransmission by the UE 502. At 508, the UE 502 may determine modes of transmission and retransmission, such as TDM, FDM, and/or SDM, for an initial RACH preamble transmission and one or more RACH preamble retransmissions. The determined modes of transmission and retransmission, at 508, may be based on specific UE implementations, signaling from the base station 504, and/or a predefined protocol.

At 510, the UE 502 may perform an initial transmission of the RACH preamble to the base station 504. The initial transmission may be based on the TDM, FDM, and/or SDM. At 512, the UE 502 may determine to retransmit the RACH preamble. For example, the network/base station 504 may provide a back-off indicator to the UE 502 associated with a time delay measured from the initial transmission, at 510. The determination, at 512, to retransmit the RACH preamble may be based on the time delay exceeding a threshold.

At 514, the UE 502 may perform N RACH preamble retransmissions based on the TDM, FDM, and/or SDM. For example, the mode of transmission may be based on UE implementations for the initial transmission, at 510, and each of the N retransmissions, at 514. Alternatively, the UE 502 or the base station 504 may determine the mode of transmission for the initial transmission, at 510, and the base station 504 may signal the mode of transmission for the N retransmissions, or a predefined protocol may be executed for the N retransmissions. In some aspects, retransmission 1 through retransmission N−1 may be based on FDM and/or SDM and the Nth retransmission may be based on TDM.

FIGS. 6A-6C illustrate diagrams 600-620 for FD operations of a UE 604b-604c and a base station 602a-602b. FD operations may be based on simultaneous UL and DL transmissions at the UE 604b-604c and/or the base station 602a-602b. In some configurations, the simultaneous UL and DL transmissions may occur in frequency range 2 (FR2). However, in other configurations, the simultaneous UL and DL transmissions may occur at a lower frequency, such as frequency range 1 (FR1) or another lower frequency, or the simultaneous UL and DL transmissions may occur at a higher frequency, such as frequency range 4 (FR4). Either or both of the UE 604a-604c and the base station 602a-602c may be configured with FD capabilities. For example, in the diagram 600, a base station 602a may transmit to UE1 604a while receiving from UE2 606 or, in the diagram 620, a UE 604c may receive from a first base station 602c/first transmission-reception point (TRP1) while transmitting to a second base station 608/second transmission-reception point (TRP2), where TRP1 and TRP2 may be associated with a same serving cell. In another example associated with the diagram 610, a UE 604b and a base station 602b/TRP may transmit and receive from each other at a same time.

An UL signal may be associated with a first panel of the UE 604b-604c and the base station 602a-602b and a DL signal may be associated with a second panel of the UE 604b-604c and the base station 602a-602b. For example, the UE 604b-604c may include two separate panels, such as a panel for UL transmissions at a first side of the UE 604b-604c and a panel for DL transmissions at a second side of the UE 604b-604c. Each panel may receive independent digital radio frequency (RF) chains for forming a beam of the panel. Based on the independent RF chains, the separate panels may form separate beams for simultaneously transmitting and receiving at the UE 604b-604c at the same time. In aspects, forming the separate beams at the same time may be conditioned upon beam separation and/or other parameters. If the UE 604b-604c is transmitting to the base station 602b/608 via a transmission panel, but the signal strength of the transmission causes leakage to a receiving panel, self-interference from the UL to the DL may occur at the UE 604b-604c. If the self-interference is too large, a DL transmission failure may occur and the FD operation may not be properly performed by the UE 604b-604c. Self-interference caused by leakage from the DL to the UL may similarly occur at the base station 602a, which may result in an UL transmission failure at the base station 602a. By implementing beam separation techniques and/or beam selection techniques for one or more beam pair candidates associated with reduced self-interference (e.g., based on measurement values), the self-interference may be sufficiently reduced for performing the FD operation.

FD operations may provide a latency reduction since the UE 604b-604c and the base station 602a-602b may not have to wait for specific UL and DL slots/symbols to perform a corresponding transmission. For example, the UE 604b-604c may receive a DL signal in an UL slot/symbol or the base station 602a-602b may receive an UL signal in a DL slot/symbol to provide the latency reduction. Thus, spectral efficiency may be increased per cell and per UE since transmissions and receptions may occur at the same time and/or at a same frequency band. For subband FD transmissions, the UL and DL signals transmitted at the same time may correspond to different frequency bands (e.g., separated by a guard band), partially overlapped frequency bands, or fully overlapped frequency bands. The FD operation may be performed with reduced self-interference/leakage such that a more efficient utilisation of resources and a higher data rate is provided.

A RACH procedure may be performed in association with a FD mode (e.g., based on FDM and/or SDM) or a half-duplex (HD) mode (e.g., based on TDM). In configurations that are based on a HD RACH, a RACH message transmission such as a message (Msg) 1 (e.g., preamble) or a Msg 3 (e.g., UL payload) in a four-step RACH procedure or a Msg A (e.g., preamble and UL payload) in a two-step RACH procedure may not overlap in time with a DL transmission, where the DL transmission may be a SSB, a PDCCH, a PDSCH or a CSI-RS. A RACH message reception such as a Msg 2 (e.g., control information) or a Msg 4 (e.g., DL payload) in a four-step RACH procedure or a Msg B (e.g., control information and DL payload) in a two-step RACH procedure may not overlap in time with an UL transmission, where the UL transmission may be a PUCCH, a PUSCH or a SRS. For example, the RACH procedure may be TDMed based on the HD mode, where a RACH preamble or another RACH message may be transmitted at one time, such that the RACH procedure may not overlap in time with a SSB, a PDCCH, a PDSCH, a CSI-RS, etc., of the DL transmission. Thus, when a RACH preamble is transmitted to the base station, no transmissions may be received in the DL, as the transmissions may be per direction and per time.

For FD mode, a RACH message may overlap in time with a DL transmission, such as the SSB, PDCCH, PDSCH, CSI-RS, etc., to increase system efficiencies and reduce latency. For example, a SSB associated with a fixed resource allocation may overlap in time with a pre-allocation for a RACH message. Types of FD RACHs may include a FDMed RACH, a SDMed RACH, or a combination of the FDMed RACH and the SDMed RACH. The FDMed RACH, which may be associated with an UL transmission, may share the same time resources as a DL transmission but may correspond to different frequency resources (e.g., separated by a guard band) or partially different frequency resources than the DL transmission. For example, the DL transmission may utilize frequency bands 1, 2, and 3 and the UL transmission for the RACH may utilize frequency bands 2, 3, and 4. The SDMed RACH, which may likewise be associated with an UL transmission, may share the same time and frequency resources as the DL transmission. Thus, the UL transmission and the DL transmission may be overlapped in time and frequency and may rely on a spatial dimension to separate the transmissions. Such separation may be based on physical separation and/or directions of the UL and DL beams. Both the FDMed RACH and the SDMed RACH may be associated with FD operations since DL transmissions may be received by the UE 604b-604c and/or transmitted by the base station 602a-602b simultaneously the RACH message.

For both types of FD RACH, the UE 604b-604c and/or the base station 602a-602b may be in a FD mode. For example, if the UE 604c is in the FD mode, the UE 604c may be connected to the first base station 602c/TRP1 for receiving DL transmissions, such as the SSB, PDCCH, PDSCH, or CSI-RS, while performing a RACH procedure with the second base station 608/TRP2. The RACH procedure may be for an initial access, a BFR, or a PDCCH order for a TA. The base station 602a-602c may configure the beam pair that is used for simultaneously transmitting to and receiving from the TRPs. For example, if the UE 604c uses beam 1 for receiving a DL transmission from the first base station 602c/TRP1 via the receiving panel, self-interference may prevent the UE 604c from transmitting beam 2 at the same time via the transmission panel. Thus, the FD RACH may be conditioned on beam separation and the first base station 602c/TRP1 may configure beam 3 for an UL transmission to the second base station 608/TRP2, such that beam 3 matches or pairs with beam 1 of the DL transmission from first base station 602c/TRP1 for simultaneously performing the RACH with the second base station 608/TRP2.

If the base station 602a-602b is in the FD mode, the base station 602a-602b may transmit a SSB to the UE 604a-604b at the same time base station 602a-602b is receiving a RACH message from the UE 604b/606. Thus, the base station 602a-602b may be transmitting the SSB while the base station 602a-602b is simultaneously receiving the RACH for the same SSB. The base station 602a-602b may configure the beam pair used for simultaneously transmitting the SSB and receiving the RACH. The Tx beam and the Rx beam may be paired based on the configuration. The base station 602a-602b may configure the beam pair via DCI, RRC signaling, or a MAC-CE. In aspects, the FD RACH may be associated with a different UE 606 than the UE 604a to which the base station 602a is transmitting the SSB.

If the base station 602a-602b is in the FD mode and the RACH message overlaps with a PDSCH transmission, the base station 602a-602b may configure a PDSCH beam to be transmitted simultaneously with reception of the beam for the RACH message. The configuration may be adjusted or signaled to provide the PDSCH beam on DL that may be paired with the RACH beam on UL. The configuration of the beam pair by the base station 602a-602b may enable the FD RACH procedure.

If the base station 602a-602b is in the FD mode and the RACH message (e.g., RACH preamble and/or RACH payload) overlaps with a CSI-RS transmission, the base station 602a-602b may configure a periodic CSI-RS beam or an aperiodic CSI-RS beam. The CSI-RS beam on DL associated with the CSI-RS resource configuration may be paired with the RACH beam on UL for simultaneously transmitting the CSI-RS beam with reception of the RACH beam. The base station 602a-602b may configure the beam pair via DCI, RRC signaling, or a MAC-CE, where the configuration may be associated with an adjustment of the CSI-RS beam.

The beam pair configuration may be used for a two-step RACH procedure (e.g., based on a message (Msg) A or a Msg B) or a four-step RACH procedure (e.g., based on a Msg 1, a Msg 2, a Msg 3, or a Msg 4). The two-step RACH procedure may be based on a preamble portion and a payload portion of the Msg A or a control portion and a payload portion of the Msg B. The Msg A may be associated with an UL signal, whereas the Msg B may be associated with a DL signal. For the Msg A, the preamble portion may correspond to the Msg 1 and the payload portion may correspond to the Msg 3. For the Msg B, the control portion may correspond to the Msg 2 and the payload portion may correspond to the Msg 4. That is, the Msg 1 and the Msg 3 may be associated with an UL signal and the Msg 2 and the Msg 4 may be associated with a DL signal. The four-step RACH procedure may be based on a combination of the Msg 1, the Msg 2, the Msg 3, and the Msg 4.

While some aspects described herein for exemplary purposes may be associated with Msg 1, such aspects may additionally or alternatively be associated with Msg 3. Further, the aspects described herein may be associated with Msg 2 and/or Msg 4. For example, Msg 2 and/or Msg 4 may overlap in time with an UL signal such as a PUCCH, PUSCH, SRS, etc., and may be FDMed or SDMed. While other aspects described herein for exemplary purposes may be associated with Msg A, such aspects may additionally or alternatively be associated with Msg B. For example, Msg B may overlap in time with an UL signal such as a PUCCH, PUSCH, SRS, etc., and may be FDMed or SDMed.

FIGS. 7A-7D illustrate diagrams 700-730 for preamble/control portions of a RACH message and payload portions of the RACH message that are transmitted/retransmitted in FD and HD modes. In a first example for the two-step RACH procedure, the base station 702a of the diagram 700 may configure the FD RACH procedure for the preamble/ control portion of the message, which may be based on a decreased signal-to-interference-plus-noise ratio (SINR), and the base station 702a may configure the HD RACH procedure for the payload portion of the message, which may be based on an increased SINR (e.g., for decoding operations). That is, in configurations associated with transmission of the RACH preamble, the UL signal may be based on Msg A, which may correspond to Msg 1 and Msg 3. In configurations associated with transmission of control information, the DL signal may be based on Msg B, which may correspond to Msg 2 and Msg 4. Decreased SINR may be used for FD operations since self-interference may occur via transmissions of the opposite direction. Thus, the SINR may be decreased for transmission of the preamble/control portion of the message. If the HD RACH procedure is used for transmission of the payload portion of the message, the SINR may be increased.

In a second example for the two-step RACH procedure, the base station 702b of the diagram 710 may configure the HD RACH procedure for the preamble/control portion of the message and the base station 702b may configure the FD RACH procedure for the payload portion of the message. That is, the configuration of the diagram 710 may be a reverse of the configuration of the diagram 700. If the FD RACH procedure is configured for the payload portion of the message, then the configuration of the corresponding beam pair may apply to just the payload portion of the message (e.g., the FD RACH configured portion of the message) and the preamble/control portion of the message (e.g., the HD RACH configured portion of the message) may not need to be paired. In configurations associated with transmission of the RACH preamble, the UL signal may be based on Msg A, which may correspond to Msg 1 and Msg 3. In configurations associated with transmission of control information, the DL signal may be based on Msg B, which may correspond to Msg 2 and Msg 4.

In a third example for the two-step RACH procedure, the base station 702c of the diagram 720 may configure the FD RACH procedure for both the preamble/control portion of the message and the payload portion of the message. That is, for transmission of the RACH preamble, the UL signal may be based on Msg A, which may correspond to Msg 1 and Msg 3, and for transmission of control information, the DL signal may be based on Msg B, which may correspond to Msg 2 and Msg 4.

In a fourth example of the two-step RACH procedure, the base station 702d of the diagram 730 may configure the HD RACH procedure for both the preamble/control portion of the message and the payload portion of the message. In configurations associated with transmission of the RACH preamble, the UL signal may be based on Msg A, which may correspond to Msg 1 and Msg 3. In configurations associated with transmission of control information, the DL signal may be based on Msg B, which may correspond to Msg 2 and Msg 4. Accordingly, each of the preamble/control portion of the message and the payload portion of the message in the diagrams 700-730 may be associated with either the FD RACH procedure or the HD RACH procedure.

A RACH procedure may be based on different modes of transmission including FDM or SDM for FD RACH procedures or TDM for HD RACH procedures. Further, RACH transmissions may be pre-allocated at certain slots or symbols (e.g., corresponding to a beam for a particular SSB). A maximum number of retransmissions for a RACH preamble may correspond to a preambleTransMax parameter. The preambleTransMax parameter may be configured based on N retransmissions via RRC signaling from the base station 702a-702d to the UE 704a-704d. The UE 704a-704d may determine to retransmit the RACH preamble based on an indication (e.g., back-off indicator) received from the network/base station 702a-702d of a threshold time delay between a previous transmission/retransmission and a next transmission/retransmission.

Mixed mode RACH retransmission for FD operations may be based on a predefined protocol and/or signaling from the base station 702a-702d. In a first example of mixed mode RACH retransmission, the mode of transmission (e.g., TDM, FDM, or SDM) for all preamble transmissions may be determined based on UE-specific implementations. For example, the UE 704a/704c may determine to perform an initial transmission of the RACH preamble based on a SDM mode of transmission and a retransmission of the RACH preamble based on a FDM or a TDM mode of transmission. In aspects, the initial transmission and all N preamble retransmission modes may be determined by the UE 702a-702d. For instance, the UE 702a-702d may determine to use a mode of transmission for the RACH preamble based on the mode of transmission that corresponds to a latest arriving RACH occasion symbol for transmitting the RACH preamble. If the latest arriving RACH occasion symbol corresponds to a FDM mode of transmission, the UE 704a/704c may transmit the RACH preamble based on the FDM mode of transmission. If the UE 704c/704d determines to perform a retransmission of the RACH preamble and the latest arriving RACH occasion unfilled symbol corresponds to a TDM mode of transmission, the UE 704c/704d may retransmit the RACH preamble based on the TDM mode of transmission.

In a second example of mixed mode RACH retransmission, a first mode of transmission for the RACH preamble may be determined by the UE 704a-704d and subsequent transmissions (e.g., retransmissions) of the RACH preamble may be determined based on an indication/signaling from the base station 702a-702d or based on a predefined protocol. For example, the UE 704a-704d may determine to use a latest RACH occasion mode of transmission for an initial transmission of the RACH preamble, which may be based on any of TDM, FDM, or SDM, and for transmissions 2 through N, or alternatively transmissions 2 through N−1 (e.g., the retransmissions of the RACH preamble), the base station 702a-702d or the predefined protocol may indicate that a different one of the TDM, the FDM, or the SDM is to be used as the mode of transmission. If the mode of the initial transmission determined by the UE 704a-704d corresponds to a failed transmission, the mode of transmission indicated via the base station 702a-702c or the predefined protocol for the retransmission may be a more reliable mode of transmission than the mode of transmission determined by the UE 704a-704d. For example, if the initial transmission is based on SDM, increased interference caused by a lack of separation in time and frequency may cause the failure. Thus, the base station 702a-702b or the predefined protocol may indicate that the UE 704a-704b should utilize FDM for the retransmission to provide a separation in frequency. If the transmission is again determined to fail, the Nth transmission (e.g., final retransmission) of the RACH preamble by UE 704c/704d may be based on TDM, as HD RACH procedures may not be associated with self-interference. The indication of the Nth transmission to be based on TDM may be determined by the UE 704c/704d via signaling from the base station 702c/702d or the predefined protocol.

In a third example of mixed mode RACH retransmission, the modes of transmission for the initial RACH preamble transmission and all N RACH preamble retransmissions may be based on an indication from the base station 702a-702d or the predefined protocol. The modes of transmission for the N RACH preamble retransmissions may correspond to any of TDM, FDM, or SDM. In aspects, the base station 702d may determine that the UE 704d is a higher priority UE and that all transmissions/retransmissions are to be based on TDM. In cases where the UE 704a is a lower priority UE and does not have a high priority rule applied thereto, the base station 702a may indicate that the UE 704a is to perform the FD RACH based on FDM or SDM. A UE that has a low self-interference may perform a RACH procedure based on SDM. Accordingly, the RACH preamble may be transmitted/retransmitted from the UE 704a-704d to the base station 702a-702d based on any of the mixed mode RACH configurations of the diagrams 700-730.

Figure 8:
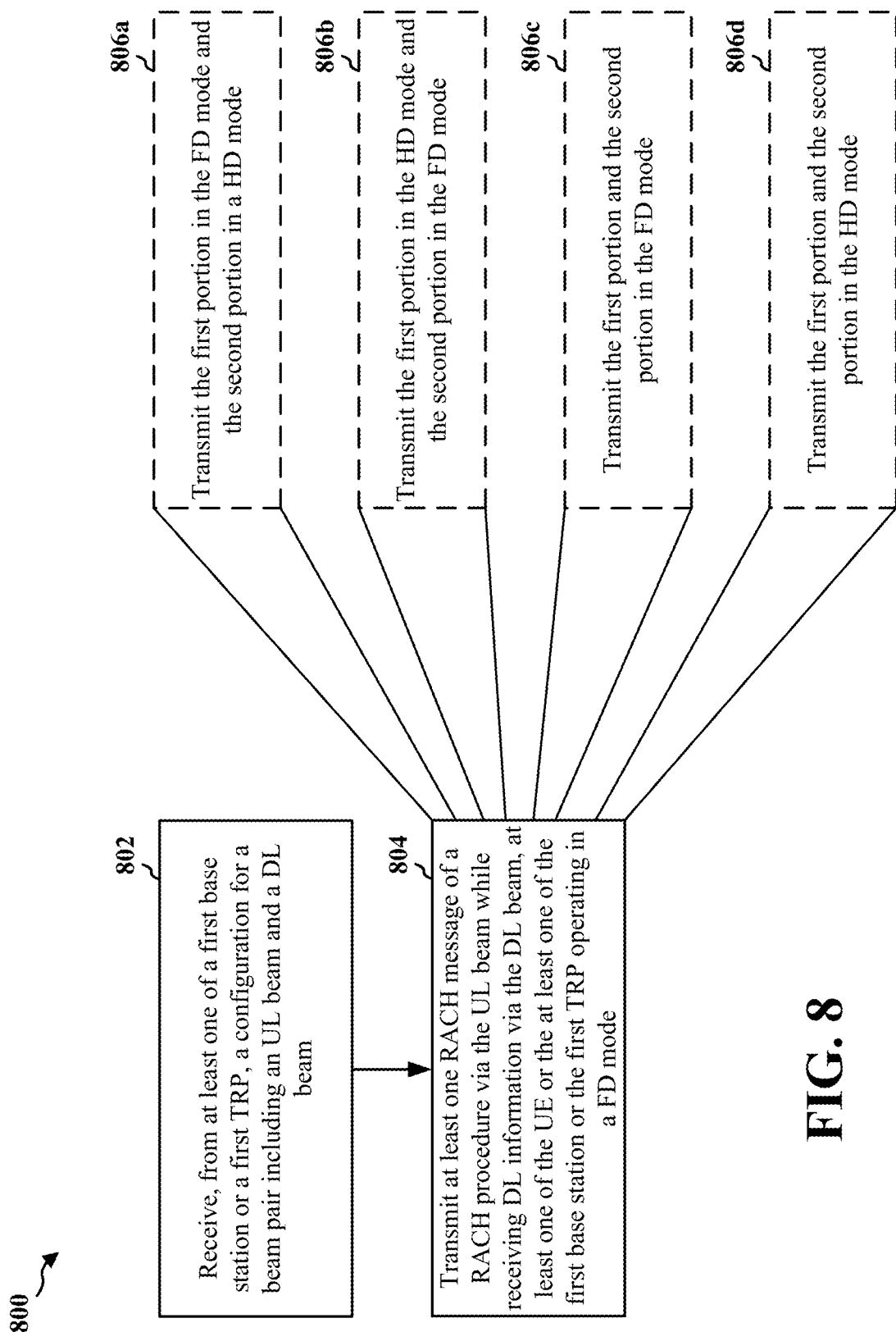
FIG. 8 is a flowchart of a method of wireless communication of a UE.

FIG. 8 is a flowchart 800 of a method of wireless communication. The method may be performed by a UE (e.g., the UE 104, 402, 604b-604c, 704a-704d; the apparatus 1202; etc.), which may include the memory 360 and which may be the entire UE 104, 402, 604b-604c, 704a-704d or a component of the UE 104, 402, 604b-604c, 704a-704d, such as the TX processor 368, the RX processor 356, and/or the controller/processor 359.

At 802, the UE may receive, from at least one of a first base station or a first TRP, a configuration for a beam pair including an UL beam and a DL beam. For example, referring to FIG. 4, the UE 402 may receive, at 406, a beam pair configuration from the base station 404. Each of the UL beam and the DL beam (e.g., indicated at 406 via the beam pair configuration) may correspond to at least one of a fully overlapped frequency band, a partially overlapped frequency band, or a non-overlapped frequency band. The configuration for the beam pair including the UL beam and the DL beam may be received (e.g., at 406) via at least one of DCI, RRC signaling, or MAC-CE.

At 804, the UE may transmit at least one RACH message of a RACH procedure via the UL beam while receiving DL information via the DL beam, at least one of the UE or the at least one of the first base station or the first TRP operating in a FD mode. For example, referring to FIGS. 4 and 6A-6C, the UE 402 may transmit, at 408a-408b, the RACH message while receiving, at 410, DL information from the base station 404. Further, the UE 604b-604c and/or the base station 602a-602b may be configured based on a FD mode. The at least one RACH message may be transmitted (e.g., at 408a by the UE 402 or by the UE 604b) via the UL beam to the at least one of the first base station 404/602b or the first TRP. The DL information (e.g., received at 410 by the UE 402 or by the UE 604b-604c) may be based on at least one of a SSB, a PDCCH, a PDSCH, or a CSI-RS. In further aspects, the at least one RACH message may be transmitted (e.g., at 408b by the UE 402 or by the UE 604c) via the UL beam to at least one of a second base station 405/608 or a second TRP that is different from the at least one of the first base station 404/602b or the first TRP. The at least one RACH message (e.g., transmitted at 408a-408b) may corresponds to at least one of a BFR or a PDCCH order. The at least one RACH message (e.g., transmitted at 408a-408b) and the DL information (e.g., received at 410) may be at least one of FDMed or SDMed.

Referring to FIGS. 7A-7D, the RACH procedure may be at least one of a two-step RACH procedure (e.g., corresponding to the diagrams 700-730) based on a Msg A or a Msg B, or a four-step RACH procedure based on a Msg 1 and a Msg 3 or a Msg 2 and a Msg 4. The at least one RACH message may include a first portion corresponding to a preamble portion (e.g., associated with Msg A/Msg 1) or a control portion (e.g., associated with the Msg B/Msg 2) and a second portion corresponding to a payload portion (e.g., associated with both Msg types A and B as well as Msg types 2 and 4).

At 806a, to transmit the at least one RACH message, the UE may transmit the first portion in the FD mode and the second portion in a HD mode. For example, referring to FIG. 7A, the UE 704a transmits the preamble portion of the RACH message to the base station 702a based on the FD mode and the UE 704a transmits the payload portion of the RACH message to the base station 702a based on the HD mode.

At 806b, to transmit the at least one RACH message, the UE may transmit the first portion in the HD mode and the second portion in the FD mode. For example, referring to FIG. 7B, the UE 704b transmits the preamble portion of the RACH message to the base station 702b based on the HD mode and the UE 704b transmits the payload portion of the RACH message to the base station 702b based on the FD mode.

At 806c, to transmit the at least one RACH message, the UE may transmit the first portion and the second portion in the FD mode. For example, referring to FIG. 7C, the UE 704c transmits the preamble portion of the RACH message and the payload portion of the RACH message to the base station 702c based on the FD mode.

At 806d, to transmit the at least one RACH message, the UE may transmit the first portion and the second portion in the HD mode. For example, referring to FIG. 7D, the UE 704d transmits the preamble portion of the RACH message and the payload portion of the RACH message to the base station 702d based on the HD mode.

Figure 9:
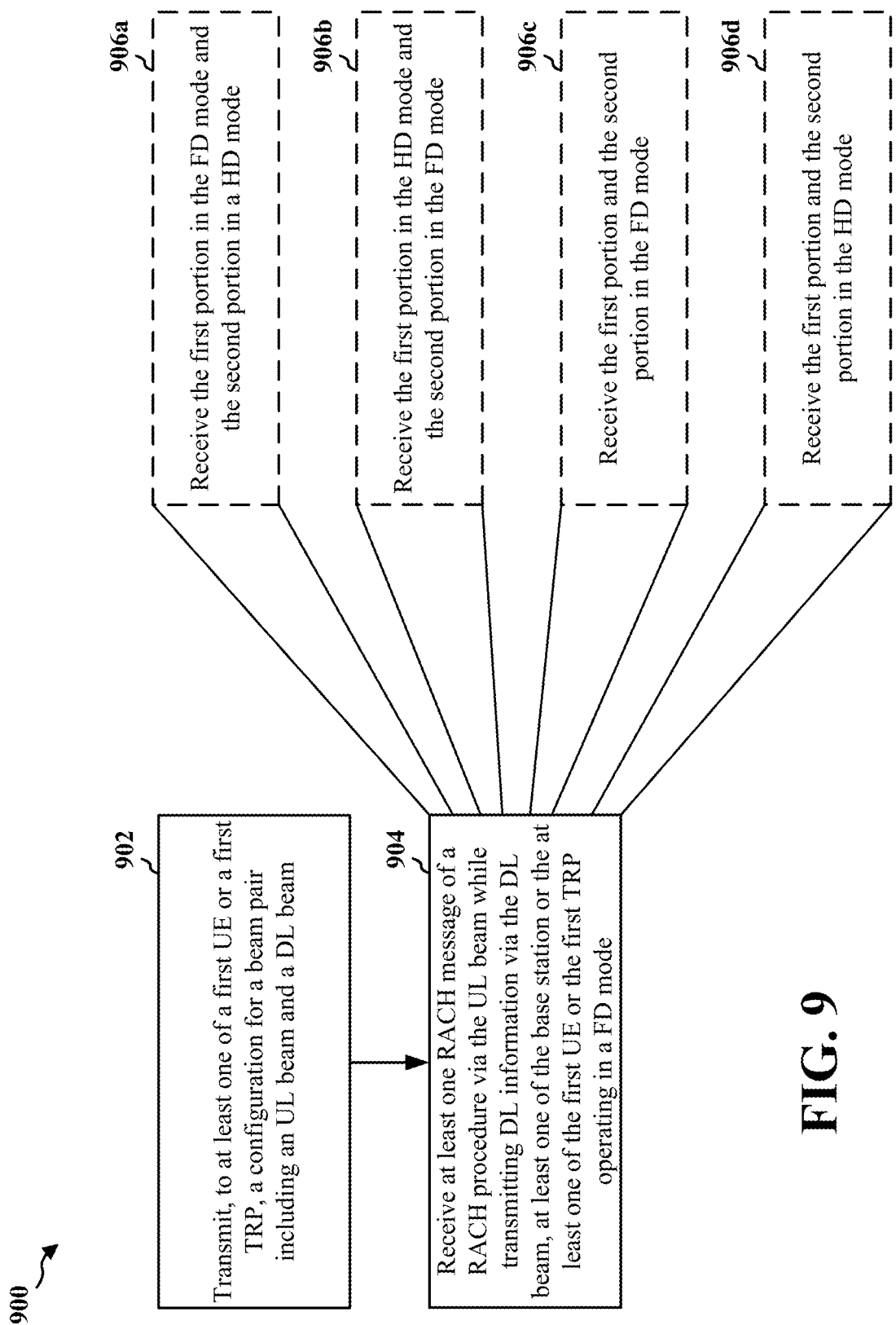
FIG. 9 is a flowchart of a method of wireless communication of a base station.

FIG. 9 is a flowchart 900 of a method of wireless communication. The method may be performed by a base station (e.g., the base station 102, 404, 602a-602b, 702a-702d; the apparatus 1302) which may include the memory 376 and which may be the entire base station 102, 404, 602a-602b, 702a-702d or a component of the base station 102, 404, 602a-602b, 702a-702d, such as the TX processor 316, the RX processor 370, and/or the controller/processor 375.

At 902, the base station may transmit, to at least one of a first UE or a first TRP, a configuration for a beam pair including an UL beam and a DL beam. For example, referring to FIG. 4, the base station 404 may transmit, at 406, a beam pair configuration to the UE 402. Each of the UL beam and the DL beam (e.g., indicated at 406 via the beam pair configuration) may correspond to at least one of a fully overlapped frequency band, a partially overlapped frequency band, or a non-overlapped frequency band. The configuration for the beam pair including the UL beam and the DL beam may be transmitted (e.g., at 406) via at least one of DCI, RRC signaling, or MAC-CE.

At 904, the base station may receive at least one RACH message of a RACH procedure via the UL beam while transmitting DL information via the DL beam, at least one of the base station or the at least one of the first UE or the first TRP operating in a FD mode. For example, referring to FIGS. 4 and 6A-6C, the base station 404 may receive, at 408a/408c, the RACH message while transmitting, at 410, DL information to the UE 402. Further, the base station 602a-602b and/or the UE 604b-604c may be configured based on a FD mode. The at least one RACH message may be received (e.g., at 408a by the base station 404 or by the base station 602b) via the UL beam from the at least one of the first UE 402/604b or the first TRP. The DL information (e.g., transmitted at 410 by the base station 404 or by the base station 602a-602b) may be based on at least one of a SSB, a PDCCH, a PDSCH, or a CSI-RS. In further aspects, the at least one RACH message may be received (e.g., at 408c from the UE 403 or from the UE 606) via the UL beam from at least one of a second UE 403/606 or a second TRP that is different from the at least one of the first UE 402/604a or the first TRP. The at least one RACH message (e.g., received at 408a/408c) may corresponds to at least one of a BFR or a PDCCH order. The at least one RACH message (e.g., received at 408a/408c) and the DL information (e.g., transmitted at 410) may be at least one of FDMed or SDMed.

Referring to FIGS. 7A-7D, the RACH procedure may be at least one of a two-step RACH procedure (e.g., corresponding to the diagrams 700-730) based on a Msg A or a Msg B, or a four-step RACH procedure based on a Msg 1 and a Msg 3 or a Msg 2 and a Msg 4. The at least one RACH message may include a first portion corresponding to a preamble portion (e.g., associated with Msg A/Msg 1) or a control portion (e.g., associated with the Msg B/Msg 2) and a second portion corresponding to a payload portion (e.g., associated with both Msg types A and B as well as Msg types 2 and 4).

At 906a, to receive the at least one RACH message, the base station may receive the first portion in the FD mode and the second portion in a HD mode. For example, referring to FIG. 7A, the base station 702a receives the preamble portion of the RACH message from the UE 704a based on the FD mode and the base station 702a receives the payload portion of the RACH message from the UE 704a based on the HD mode.

At 906b, to receive the at least one RACH message, the base station may receive the first portion in the HD mode and the second portion in the FD mode. For example, referring to FIG. 7B, the base station 702b receives the preamble portion of the RACH message from the UE 704b based on the HD mode and the base station 702b receives the payload portion of the RACH message from the UE 704b based on the FD mode.

At 906c, to receive the at least one RACH message, the base station may receive the first portion and the second portion in the FD mode. For example, referring to FIG. 7C, the base station 702c receives the preamble portion of the RACH message and the payload portion of the RACH message from the UE 704c based on the FD mode.

At 906d, to receive the at least one RACH message, the base station may receive the first portion and the second portion in the HD mode. For example, referring to FIG. 7D, the base station 702d receives the preamble portion of the RACH message and the payload portion of the RACH message from the UE 704d based on the HD mode.

Figure 10:
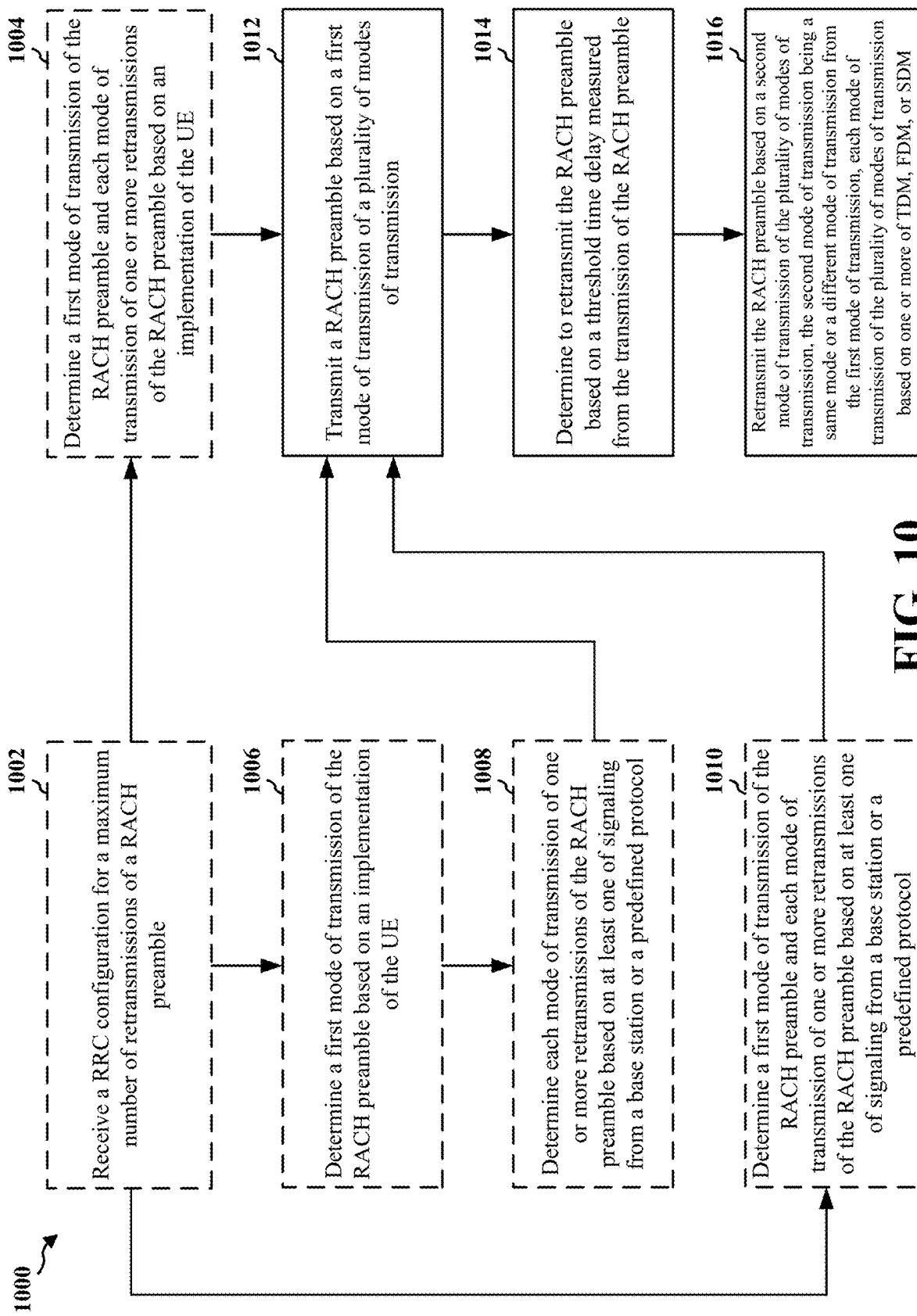
FIG. 10 is a flowchart of a method of wireless communication of a UE.

FIG. 10 is a flowchart 1000 of a method of wireless communication. The method may be performed by a UE (e.g., the UE 104, 502, 604b-604c, 704a-704d; the apparatus 1402; etc.), which may include the memory 360 and which may be the entire UE 104, 502, 604b-604c, 704a-704d or a component of the UE 104, 502, 604b-604c, 704a-704d, such as the TX processor 368, the RX processor 356, and/or the controller/processor 359.

At 1002, the UE may receive a RRC configuration for a maximum number of retransmissions of a RACH preamble. For example, referring to FIG. 5, the UE 502 may receive, at 506, a preambleTransMax parameter from the base station 504.

At 1004, the UE may determine a first mode of transmission of the RACH preamble and each mode of transmission of one or more retransmissions of the RACH preamble based on an implementation of the UE. For example, referring to FIG. 5, the UE 502 may determine, at 508, all modes of transmission and retransmission to the base station 504 based on UE implementations.

At 1006, the UE may alternatively determine a first mode of transmission of the RACH preamble based on an implementation of the UE. For example, referring to FIGS. 5 and 7A-7D, the UE 502/704a-704b may determine, at 508, a mode of the initial transmission to the base station 504/702a-702d based on a UE implementation.

At 1008, the UE may determine each mode of transmission of one or more retransmissions of the RACH preamble based on at least one of signaling from a base station or a predefined protocol. For example, referring to FIGS. 5 and 7A-7D, the UE 502/704a-704d may determine, at 508, a mode of each of the N retransmissions to the base station 504/702a-702c based on base station signaling and/or a predefined protocol. In aspects, a last retransmission (e.g., the Nth retransmission) of the RACH preamble may be based on TDM.

At 1010, the UE may alternatively determine a first mode of transmission of the RACH preamble and each mode of transmission of one or more retransmissions of the RACH preamble based on at least one of signaling from a base station or a predefined protocol. For example, referring to FIG. 5, the UE 502 may determine, at 508, all modes of transmission and retransmission to the base station 504 based on base station signaling and/or a predefined protocol.

At 1012, the UE may transmit a RACH preamble based on a first mode of transmission of a plurality of modes of transmission. For example, referring to FIGS. 5 and 7A-7D, the UE 502/704a-704b may transmit, at 510, a RACH preamble to the base station 504/702a-702d in a HD mode or a FD mode based on TDM, FDM, and/or SDM.

At 1014, the UE may determine to retransmit the RACH preamble based on a threshold time delay measured from the transmission of the RACH preamble. For example, referring to FIG. 5, the UE 502 may determine, at 512, to retransmit the RACH preamble.

At 1016, the UE may retransmit the RACH preamble based on a second mode of transmission of the plurality of modes of transmission, the second mode of transmission being a same mode or a different mode of transmission from the first mode of transmission, each mode of transmission of the plurality of modes of transmission based on one or more of TDM, FDM, or SDM. For example, referring to FIGS. 5 and 7A-7D, the UE 502/704a-704d may retransmit, at 514, the RACH preamble (e.g., based on N retransmissions) to the base station 504/702a-702c in a HD mode or a FD mode. The RACH preamble may be retransmitted (e.g., at 514) in one or more retransmissions based on the plurality of modes of transmission (e.g., TDM, FDM, and/or SDM).

Figure 11:
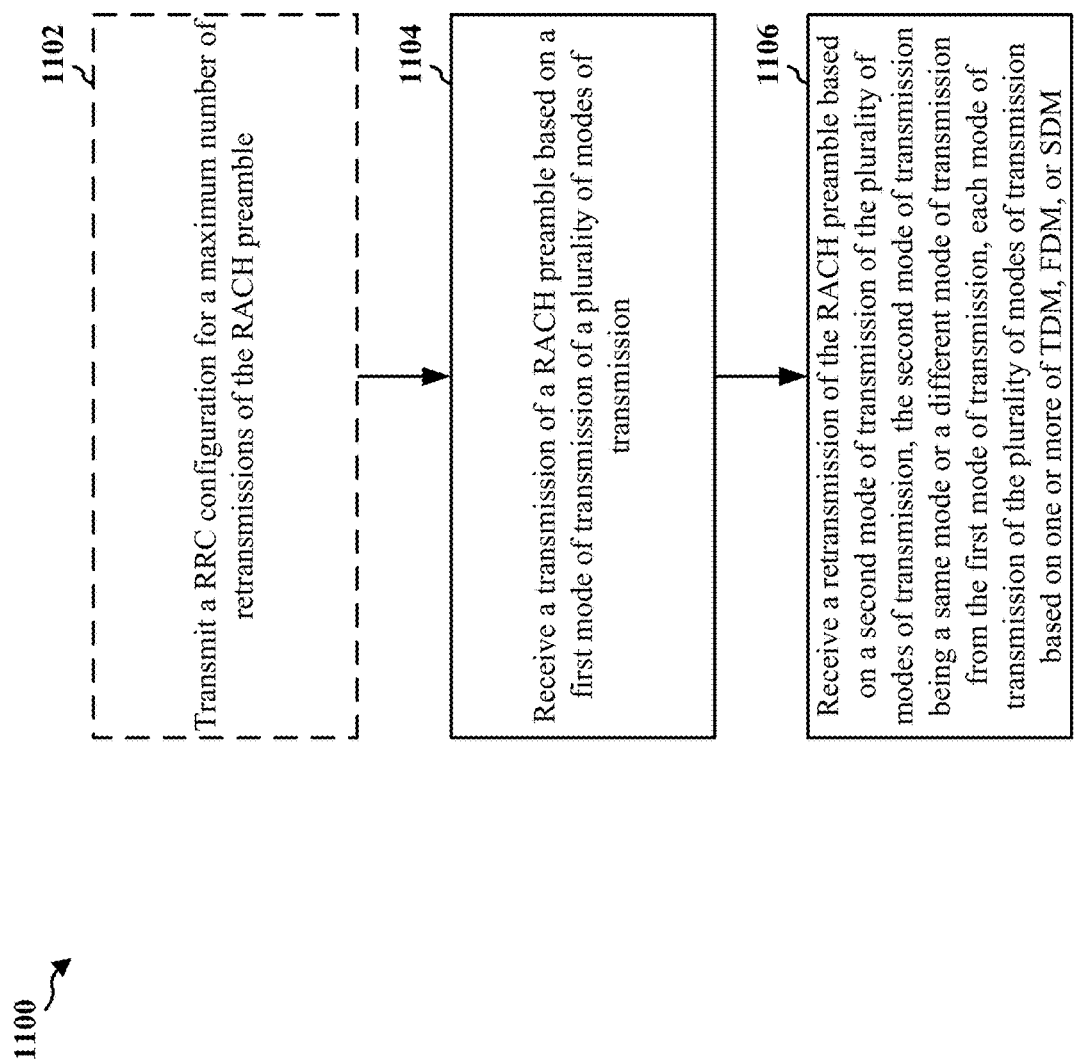
FIG. 11 is a flowchart of a method of wireless communication of a base station.

FIG. 11 is a flowchart 1100 of a method of wireless communication. The method may be performed by a base station (e.g., the base station 102, 504, 602a-602b, 702a-702d; the apparatus 1502), which may include the memory 376 and which may be the entire base station 102, 504, 602a-602b, 702a-702d or a component of the base station 102, 504, 602a-602b, 702a-702d, such as the TX processor 316, the RX processor 370, and/or the controller/processor 375.

At 1102, the base station may transmit a RRC configuration for a maximum number of retransmissions of the RACH preamble. For example, referring to FIG. 5, the base station 504 may transmit, at 506, a preambleTransMax parameter to the UE 502.

At 1104, the base station may receive a transmission of a RACH preamble based on a first mode of transmission of a plurality of modes of transmission. For example, referring to FIG. 5, the base station 504 may receive, at 510, a RACH preamble based on TDM, FDM, and/or SDM.

At 1106, the base station may receive a retransmission of the RACH preamble based on a second mode of transmission of the plurality of modes of transmission, the second mode of transmission being a same mode or a different mode of transmission from the first mode of transmission, each mode of transmission of the plurality of modes of transmission based on one or more of TDM, FDM, or SDM. For example, referring to FIG. 5, the base station 504 may receive, at 514, the RACH preamble retransmission (e.g., based on N retransmissions) from the UE 502 in a HD mode or a FD mode. The RACH preamble may be received (e.g., at 514) via one or more retransmissions based on the plurality of modes of transmission (e.g., TDM, FDM, and/or SDM).

The first mode of transmission of the RACH preamble (e.g., TDM, FDM, and/or SDM) and each mode of transmission of the one or more retransmissions of the RACH preamble (e.g., TDM, FDM, and/or SDM) may be determined based on an implementation of the UE 502. Alternatively, the first mode of transmission of the RACH preamble (e.g., TDM, FDM, and/or SDM) may be determined based on an implementation of the UE 502 and each mode of transmission of the one or more retransmissions of the RACH preamble (e.g., TDM, FDM, and/or SDM) may be determined based on at least one of signaling from the base station 504 or a predefined protocol. In aspects, a last retransmission (e.g., Nth retransmission) of the one or more retransmissions of the RACH preamble may be based on TDM. Alternatively, the first mode of transmission of the RACH preamble (e.g., TDM, FDM, and/or SDM) and each mode of transmission of the one or more retransmissions of the RACH preamble (e.g., TDM, FDM, and/or SDM) may be determined based on at least one of signaling from the base station 504 or the predefined protocol.

Figure 12:
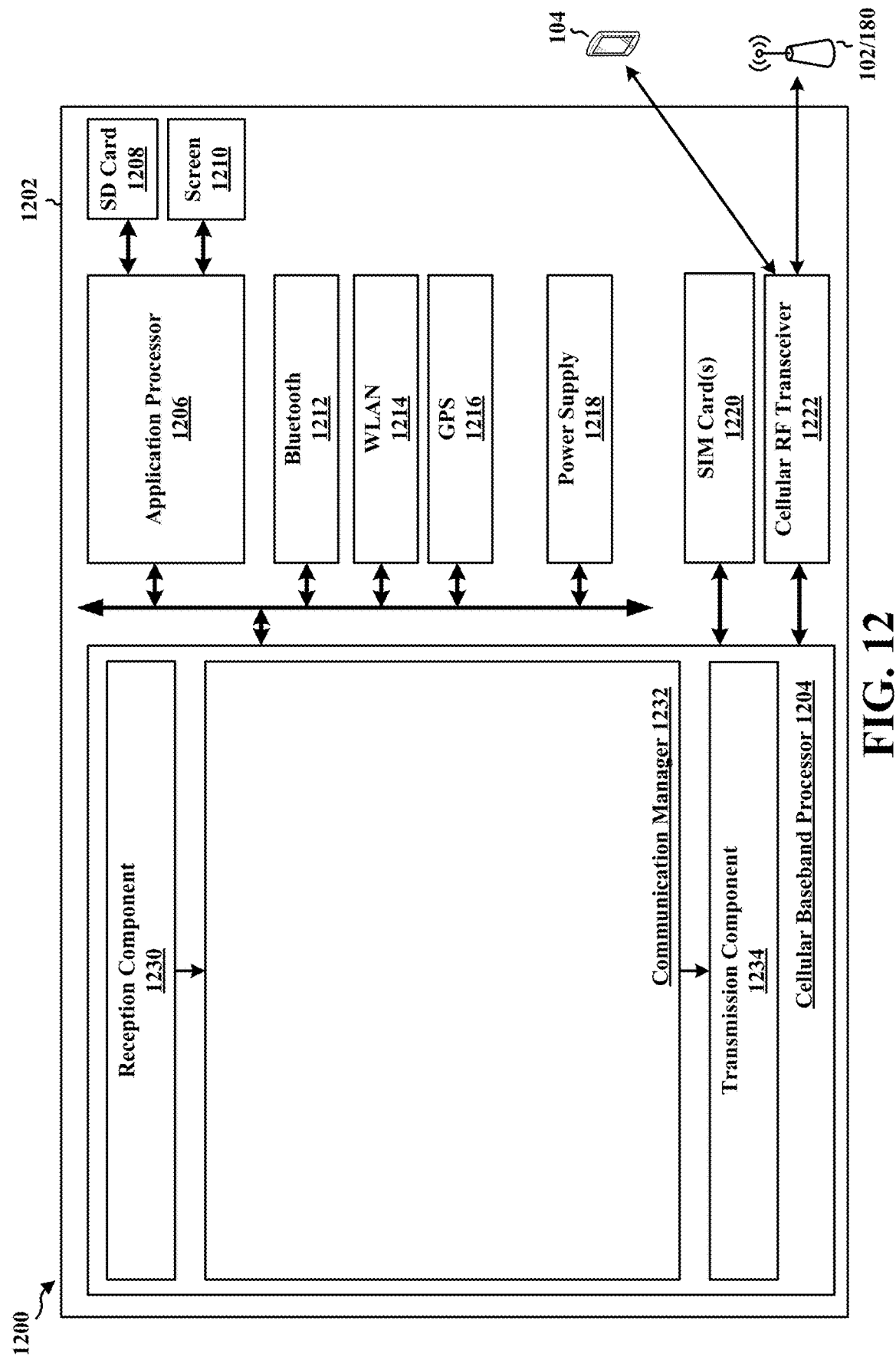
FIG. 12 is a diagram illustrating an example of a hardware implementation for an example apparatus.

FIG. 12 is a diagram 1200 illustrating an example of a hardware implementation for an apparatus 1202. The apparatus 1202 is a UE and includes a cellular baseband processor 1204 (also referred to as a modem) coupled to a cellular RF transceiver 1222 and one or more subscriber identity modules (SIM) cards 1220, an application processor 1206 coupled to a secure digital (SD) card 1208 and a screen 1210, a Bluetooth module 1212, a wireless local area network (WLAN) module 1214, a Global Positioning System (GPS) module 1216, and a power supply 1218. The cellular baseband processor 1204 communicates through the cellular RF transceiver 1222 with the UE 104 and/or BS 102/180. The cellular baseband processor 1204 may include a computer-readable medium/memory. The computer-readable medium/memory may be non-transitory. The cellular baseband processor 1204 is responsible for general processing, including the execution of software stored on the computer-readable medium/memory. The software, when executed by the cellular baseband processor 1204, causes the cellular baseband processor 1204 to perform the various functions described supra. The computer-readable medium/memory may also be used for storing data that is manipulated by the cellular baseband processor 1204 when executing software. The cellular baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the cellular baseband processor 1204. The cellular baseband processor 1204 may be a component of the UE 350 and may include the memory 360 and/or at least one of the TX processor 368, the RX processor 356, and the controller/processor 359. In one configuration, the apparatus 1202 may be a modem chip and include just the baseband processor 1204, and in another configuration, the apparatus 1202 may be the entire UE (e.g., see 350 of FIG. 3) and include the aforediscussed additional modules of the apparatus 1202.

The reception component 1230 is configured, e.g., as described in connection with 802, to receive, from at least one of a first base station or a first TRP, a configuration for a beam pair including an UL beam and a DL beam. The transmission component 1234 is configured, e.g., as described in connection with 804 and 806a-806d, to transmit at least one RACH message of a RACH procedure via the UL beam while receiving DL information via the DL beam, at least one of the UE or the at least one of the first base station or the first TRP operating in a FD mode; to transmit the first portion in the FD mode and the second portion in a HD mode; to transmit the first portion in the HD mode and the second portion in the FD mode; to transmit the first portion and the second portion in the FD mode; and to transmit the first portion and the second portion in the HD mode.

The apparatus may include additional components that perform each of the blocks of the algorithm in the aforementioned flowchart of FIG. 8. As such, each block in the aforementioned flowchart of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the cellular baseband processor 1204, includes means for receiving, from at least one of a first base station or a first TRP, a configuration for a beam pair including an UL beam and a DL beam; and means for transmitting at least one RACH message of a RACH procedure via the UL beam while receiving DL information via the DL beam, at least one of the UE or the at least one of the first base station or the first TRP operating in a FD mode. The apparatus 1202 may further include means for transmitting the first portion in the FD mode and the second portion in a HD mode. The apparatus 1202 may further include means for transmitting the first portion in the HD mode and the second portion in the FD mode. The apparatus 1202 may further include means for transmitting the first portion and the second portion in the FD mode. The apparatus 1202 may further include means for transmitting the first portion and the second portion in the HD mode. The aforementioned means may be one or more of the aforementioned components of the apparatus 1202 configured to perform the functions recited by the aforementioned means. As described supra, the apparatus 1202 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 13:
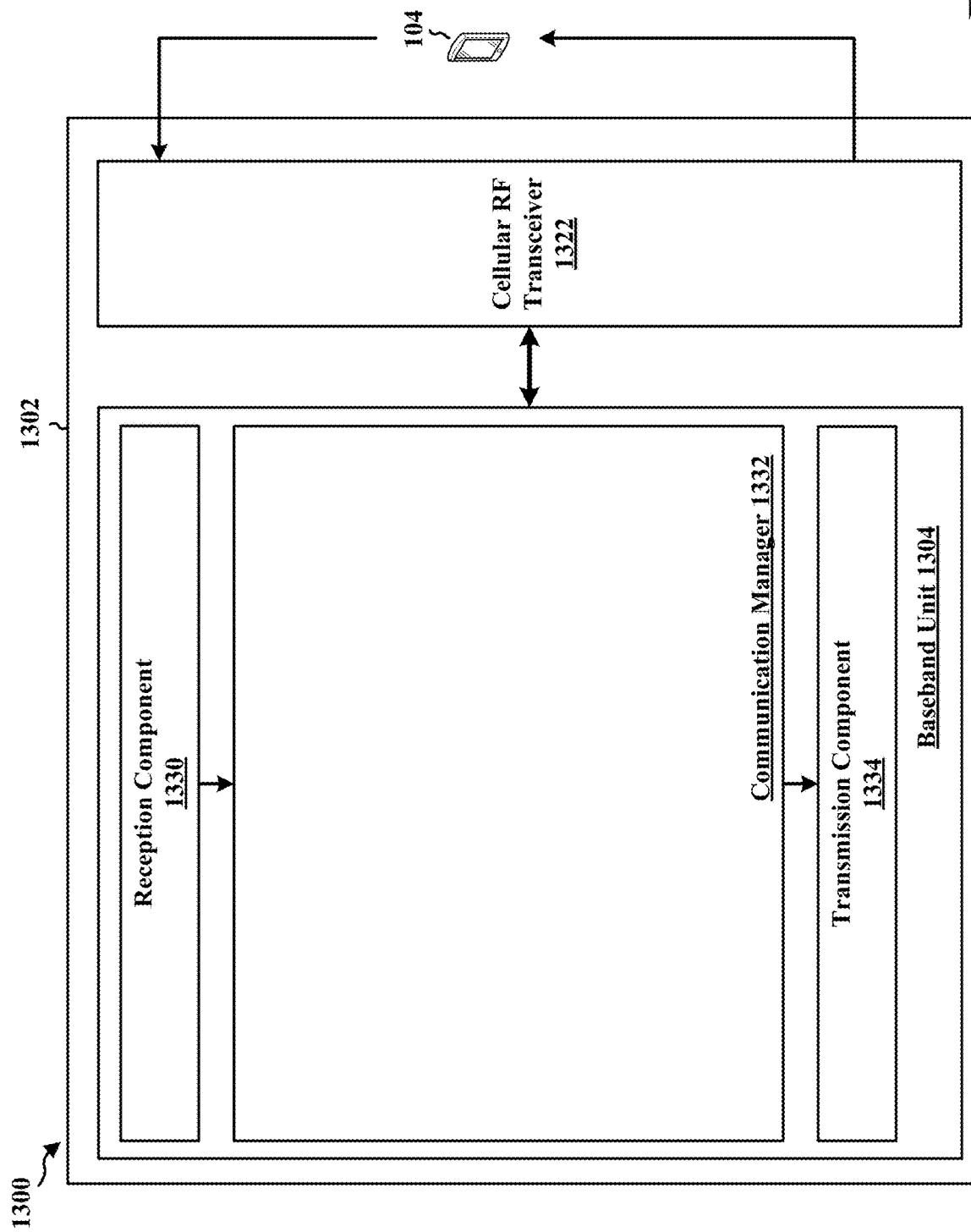
FIG. 13 is a diagram illustrating an example of a hardware implementation for an example apparatus.

FIG. 13 is a diagram 1300 illustrating an example of a hardware implementation for an apparatus 1302. The apparatus 1302 is a BS and includes a baseband unit 1304. The baseband unit 1304 may communicate through a cellular RF transceiver 1322 with the UE 104. The baseband unit 1304 may include a computer-readable medium/memory. The baseband unit 1304 is responsible for general processing, including the execution of software stored on the computer-readable medium/memory. The software, when executed by the baseband unit 1304, causes the baseband unit 1304 to perform the various functions described supra. The computer-readable medium/memory may also be used for storing data that is manipulated by the baseband unit 1304 when executing software. The baseband unit 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the baseband unit 1304. The baseband unit 1304 may be a component of the BS 310 and may include the memory 376 and/or at least one of the TX processor 316, the RX processor 370, and the controller/processor 375.

The reception component 1330 is configured, e.g., as described in connection with 904 and 906a-906d, to receive at least one RACH message of a RACH procedure via the UL beam while transmitting DL information via the DL beam, at least one of the base station or the at least one of the first UE or the first TRP operating in a FD mode; to receive the first portion in the FD mode and the second portion in a HD mode; to receive the first portion in the HD mode and the second portion in the FD mode; to receive the first portion and the second portion in the FD mode; and to receive the first portion and the second portion in the HD mode. The transmission component 1334 is configured, e.g., as described in connection with 902, to transmit, to at least one of a first UE or a first TRP, a configuration for a beam pair including an UL beam and a DL beam.

The apparatus may include additional components that perform each of the blocks of the algorithm in the aforementioned flowchart of FIG. 9. As such, each block in the aforementioned flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1302, and in particular the baseband unit 1304, includes means for transmitting, to at least one of a first UE or a first TRP, a configuration for a beam pair including an UL beam and a DL beam; and means for receiving at least one RACH message of a RACH procedure via the UL beam while transmitting DL information via the DL beam, at least one of the base station or the at least one of the first UE or the first TRP operating in a FD mode. The apparatus 1302 may further include means for receiving the first portion in the FD mode and the second portion in a HD mode. The apparatus 1302 may further include means for receiving the first portion in the HD mode and the second portion in the FD mode. The apparatus 1302 may further include means for receiving the first portion and the second portion in the FD mode. The apparatus 1302 may further include means for receiving the first portion and the second portion in the HD mode. The aforementioned means may be one or more of the aforementioned components of the apparatus 1302 configured to perform the functions recited by the aforementioned means. As described supra, the apparatus 1302 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 14:
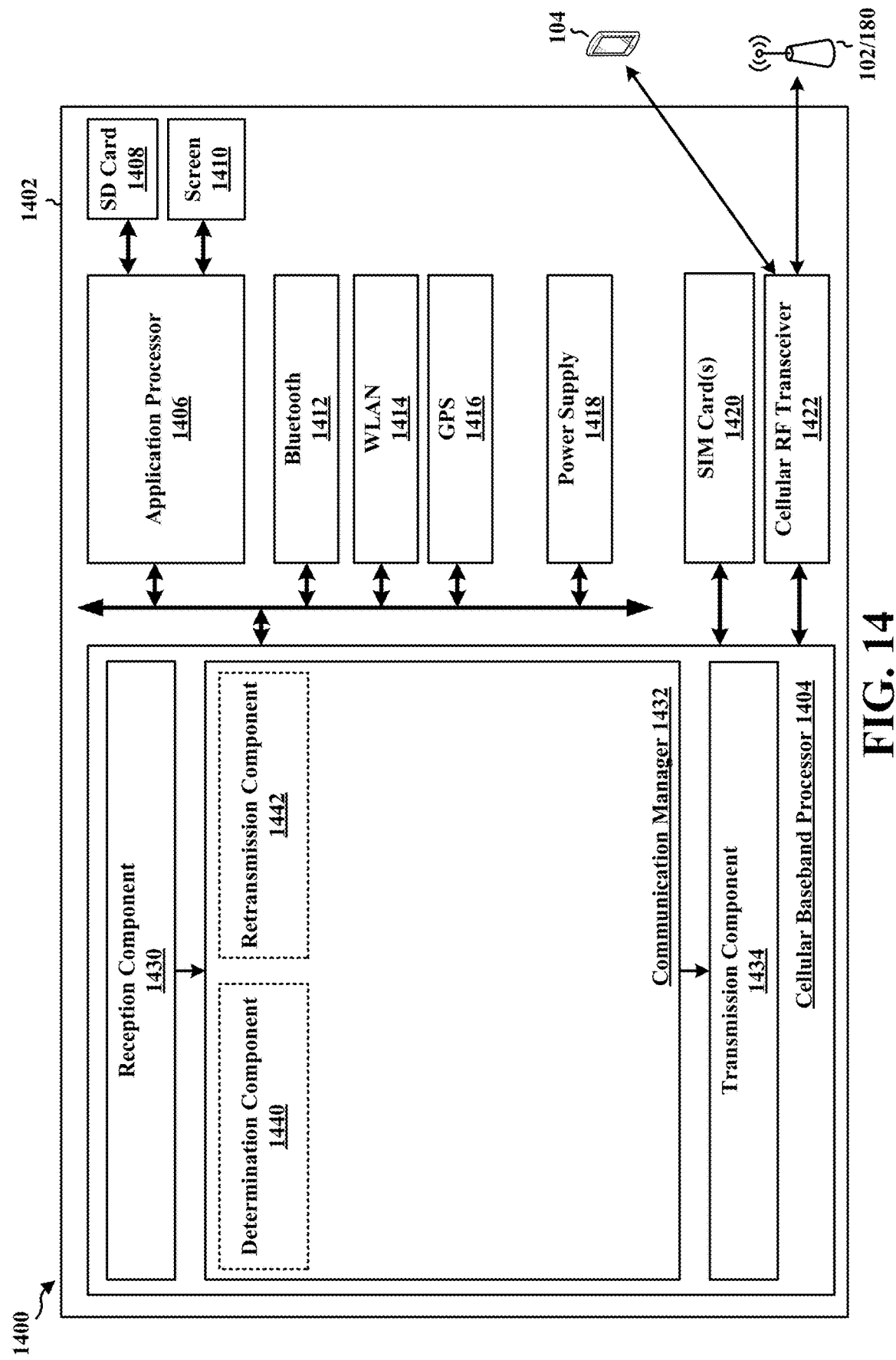
FIG. 14 is a diagram illustrating an example of a hardware implementation for an example apparatus.

FIG. 14 is a diagram 1400 illustrating an example of a hardware implementation for an apparatus 1402. The apparatus 1402 is a UE and includes a cellular baseband processor 1404 (also referred to as a modem) coupled to a cellular RF transceiver 1422 and one or more subscriber identity modules (SIM) cards 1420, an application processor 1406 coupled to a secure digital (SD) card 1408 and a screen 1410, a Bluetooth module 1412, a wireless local area network (WLAN) module 1414, a Global Positioning System (GPS) module 1416, and a power supply 1418. The cellular baseband processor 1404 communicates through the cellular RF transceiver 1422 with the UE 104 and/or BS 102/180. The cellular baseband processor 1404 may include a computer-readable medium/memory. The computer-readable medium/memory may be non-transitory. The cellular baseband processor 1404 is responsible for general processing, including the execution of software stored on the computer-readable medium/memory. The software, when executed by the cellular baseband processor 1404, causes the cellular baseband processor 1404 to perform the various functions described supra. The computer-readable medium/memory may also be used for storing data that is manipulated by the cellular baseband processor 1404 when executing software. The cellular baseband processor 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the cellular baseband processor 1404. The cellular baseband processor 1404 may be a component of the UE 350 and may include the memory 360 and/or at least one of the TX processor 368, the RX processor 356, and the controller/processor 359. In one configuration, the apparatus 1402 may be a modem chip and include just the baseband processor 1404, and in another configuration, the apparatus 1402 may be the entire UE (e.g., see 350 of FIG. 3) and include the aforediscussed additional modules of the apparatus 1402.

The reception component 1430 is configured, e.g., as described in connection with 1002, to receive a RRC configuration for a maximum number of retransmissions of a RACH preamble. The communication manager 1432 includes a determination component 1440 that is configured, e.g., as described in connection with 1004, 1006, 1008, 1010, and 1014, to determine a first mode of transmission of the RACH preamble and each mode of transmission of one or more retransmissions of the RACH preamble based on an implementation of the UE; to determine a first mode of transmission of the RACH preamble based on an implementation of the UE; to determine each mode of transmission of one or more retransmissions of the RACH preamble based on at least one of signaling from a base station or a predefined protocol; to determine a first mode of transmission of the RACH preamble and each mode of transmission of one or more retransmissions of the RACH preamble based on at least one of signaling from a base station or a predefined protocol; and to determine to retransmit the RACH preamble based on a threshold time delay measured from the transmission of the RACH preamble. The communication manager 1432 further includes a retransmission component 1142 that is configured, e.g., as described in connection with 1016, to retransmit the RACH preamble based on a second mode of transmission of the plurality of modes of transmission, the second mode of transmission being a same mode or a different mode of transmission from the first mode of transmission, each mode of transmission of the plurality of modes of transmission based on one or more of TDM, FDM, or SDM. The transmission component 1434 is configured, e.g., as described in connection with 1012, to transmit a RACH preamble based on a first mode of transmission of a plurality of modes of transmission.

The apparatus may include additional components that perform each of the blocks of the algorithm in the aforementioned flowchart of FIG. 10. As such, each block in the aforementioned flowchart of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1402, and in particular the cellular baseband processor 1404, includes means for transmitting a RACH preamble based on a first mode of transmission of a plurality of modes of transmission; means for determining to retransmit the RACH preamble based on a threshold time delay measured from the transmission of the RACH preamble; and means for retransmitting the RACH preamble based on a second mode of transmission of the plurality of modes of transmission, the second mode of transmission being a same mode or a different mode of transmission from the first mode of transmission, each mode of transmission of the plurality of modes of transmission based on one or more of TDM, FDM, or SDM. The apparatus 1402 further includes means for determining the first mode of transmission of the RACH preamble and each mode of transmission of the one or more retransmissions of the RACH preamble based on an implementation of the UE. The apparatus 1402 further includes means for determining the first mode of transmission of the RACH preamble based on an implementation of the UE; and means for determining each mode of transmission of the one or more retransmissions of the RACH preamble based on at least one of signaling from a base station or a predefined protocol. The apparatus 1402 further includes means for determining the first mode of transmission of the RACH preamble and each mode of transmission of the one or more retransmissions of the RACH preamble based on at least one of signaling from a base station or a predefined protocol. The apparatus 1402 further includes means for receiving a RRC configuration for a maximum number of retransmissions of the RACH preamble. The aforementioned means may be one or more of the aforementioned components of the apparatus 1402 configured to perform the functions recited by the aforementioned means. As described supra, the apparatus 1402 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 15:
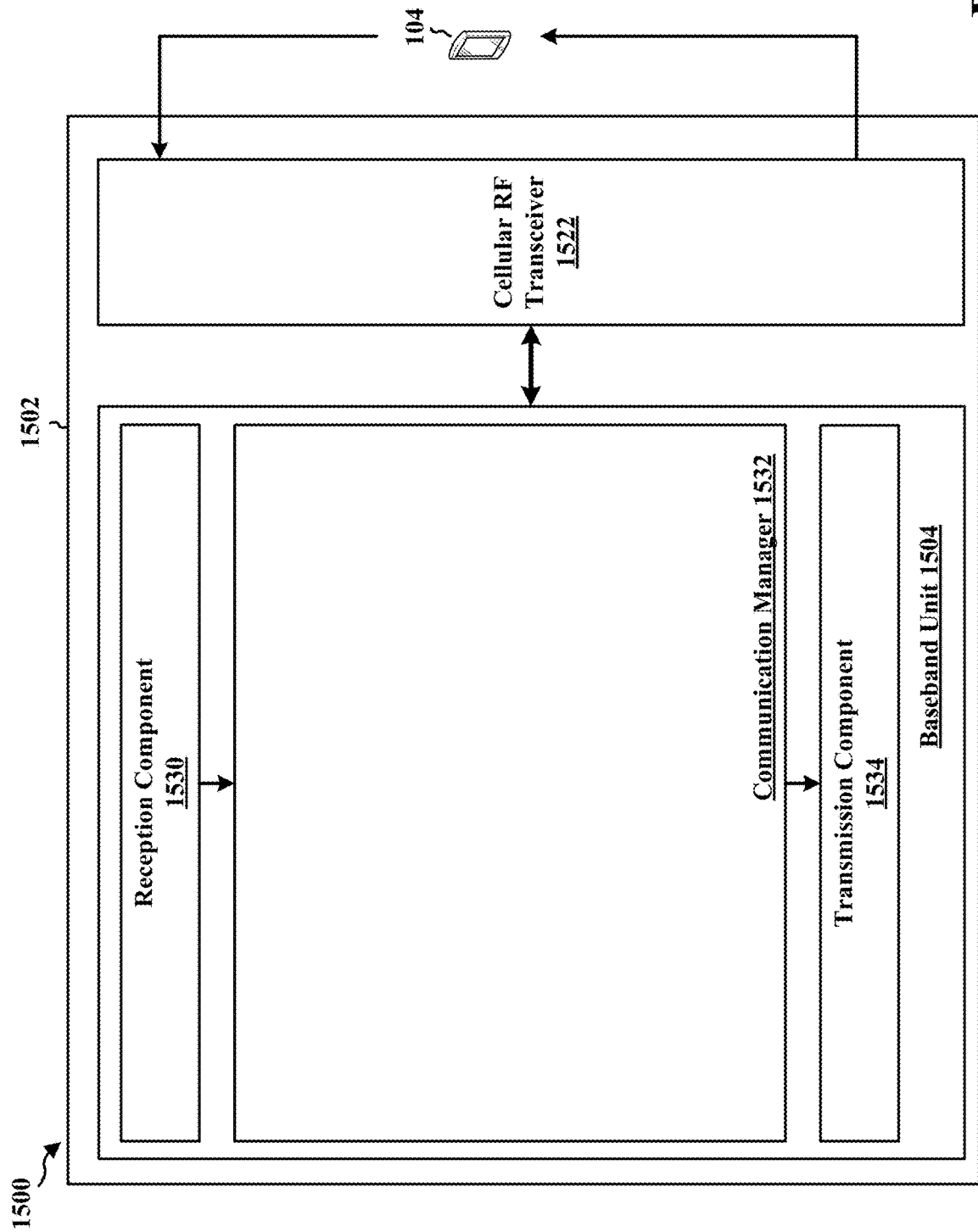
FIG. 15 is a diagram illustrating an example of a hardware implementation for an example apparatus.

FIG. 15 is a diagram 1500 illustrating an example of a hardware implementation for an apparatus 1502. The apparatus 1502 is a BS and includes a baseband unit 1504. The baseband unit 1504 may communicate through a cellular RF transceiver 1522 with the UE 104. The baseband unit 1504 may include a computer-readable medium/memory. The baseband unit 1504 is responsible for general processing, including the execution of software stored on the computer-readable medium/memory. The software, when executed by the baseband unit 1504, causes the baseband unit 1504 to perform the various functions described supra. The computer-readable medium/memory may also be used for storing data that is manipulated by the baseband unit 1504 when executing software. The baseband unit 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the baseband unit 1504. The baseband unit 1504 may be a component of the BS 310 and may include the memory 376 and/or at least one of the TX processor 316, the RX processor 370, and the controller/processor 375.

The reception component 1530 is configured, e.g., as described in connection with 1104 and 1106, to receive a transmission of a RACH preamble based on a first mode of transmission of a plurality of modes of transmission; and to receive a retransmission of the RACH preamble based on a second mode of transmission of the plurality of modes of transmission, the second mode of transmission being a same mode or a different mode of transmission from the first mode of transmission, each mode of transmission of the plurality of modes of transmission based on one or more of TDM, FDM, or SDM. The transmission component 1534 is configured, e.g., as described in connection with 1102, to transmit a RRC configuration for a maximum number of retransmissions of the RACH preamble.

The apparatus may include additional components that perform each of the blocks of the algorithm in the aforementioned flowchart of FIG. 11. As such, each block in the aforementioned flowchart of FIG. 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1502, and in particular the baseband unit 1504, includes means for receiving a transmission of a RACH preamble based on a first mode of transmission of a plurality of modes of transmission; and means for receiving a retransmission of the RACH preamble based on a second mode of transmission of the plurality of modes of transmission, the second mode of transmission being a same mode or a different mode of transmission from the first mode of transmission, each mode of transmission of the plurality of modes of transmission based on one or more of TDM, FDM, or SDM. The apparatus 1502 further includes means for transmitting a radio resource control (RRC) configuration for a maximum number of retransmissions of the RACH preamble. The aforementioned means may be one or more of the aforementioned components of the apparatus 1502 configured to perform the functions recited by the aforementioned means. As described supra, the apparatus 1502 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication of a UE, characterized by: receiving, from at least one of a first base station or a first TRP, a configuration for a beam pair including an UL beam and a DL beam; and transmitting at least one RACH message of a RACH procedure via the UL beam while receiving DL information via the DL beam, at least one of the UE or the at least one of the first base station or the first TRP operating in a FD mode.

Aspect 2 may be combined with aspect 1 and is characterized in that the at least one RACH message is transmitted via the UL beam to the at least one of the first base station or the first TRP.

Aspect 3 may be combined with any of aspects 1-2 and is characterized in that the DL information is based on at least one of a SSB, a PDCCH, a PDSCH, or a CSI-RS.

Aspect 4 may be combined with any of aspects 1 or 3 and is characterized in that the at least one RACH message is transmitted via the UL beam to at least one of a second base station or a second TRP that is different from the at least one of the first base station or the first TRP.

Aspect 5 may be combined with any of aspects 1-4 and is characterized in that the at least one RACH message corresponds to at least one of a BFR or a PDCCH order.

Aspect 6 may be combined with any of aspects 1-5 and is characterized in that the at least one RACH message includes a first portion corresponding to a preamble portion or a control portion and a second portion corresponding to a payload portion, the characterization of transmitting the at least one RACH message further characterized by one of: transmitting the first portion in the FD mode and the second portion in a HD mode; transmitting the first portion in the HD mode and the second portion in the FD mode; transmitting the first portion and the second portion in the FD mode; or transmitting the first portion and the second portion in the HD mode.

Aspect 7 may be combined with any of aspects 1-6 and is characterized in that the RACH procedure is at least one of a two-step RACH procedure based on a Msg A or a Msg B, or a four-step RACH procedure based on a Msg 1 and a Msg 3 or a Msg 2 and a Msg 4.

Aspect 8 may be combined with any of aspects 1-7 and is characterized in that the at least one RACH message and the DL information are at least one of FDMed or SDMed.

Aspect 9 may be combined with any of aspects 1-8 and is characterized in that each of the UL beam and the DL beam correspond to at least one of a fully overlapped frequency band, a partially overlapped frequency band, or a non-overlapped frequency band.

Aspect 10 may be combined with any of aspects 1-9 and is characterized in that the configuration for the beam pair including the UL beam and the DL beam is received via at least one of DCI, RRC signaling, or a MAC-CE.

Aspect 11 is a method of wireless communication of a base station, characterized by: transmitting, to at least one of a first UE or a first TRP, a configuration for a beam pair including an UL beam and a DL beam; and receiving at least one RACH message of a RACH procedure via the UL beam while transmitting DL information via the DL beam, at least one of the base station or the at least one of the first UE or the first TRP operating in a FD mode.

Aspect 12 may be combined with aspect 11 and is characterized in that the at least one RACH message is received via the UL beam from the at least one of the first UE or the first TRP.

Aspect 13 may be combined with any of aspects 11-12 and is characterized in that the DL information is based on at least one of a SSB, a PDCCH, a PDSCH, or a CSI-RS.

Aspect 14 may be combined with any of aspects 11 or 13 and is characterized in that the at least one RACH message is received via the UL beam from at least one of a second UE or a second TRP that is different from the at least one of the first UE or the first TRP.

Aspect 15 may be combined with any of aspects 11-14 and is characterized in that the at least one RACH message corresponds to at least one of a BFR or a PDCCH order.

Aspect 16 may be combined with any of aspects 11-15 and is characterized in that the at least one RACH message includes a first portion corresponding to a preamble portion or a control portion and a second portion corresponding to a payload portion, the characterization of receiving the at least one RACH message further characterized by one of: receiving the first portion in the FD mode and the second portion in a HD mode; receiving the first portion in the HD mode and the second portion in the FD mode; receiving the first portion and the second portion in the FD mode; or receiving the first portion and the second portion in the HD mode.

Aspect 17 may be combined with any of aspects 11-16 and is characterized in that the RACH procedure is at least one of a two-step RACH procedure based on a Msg A or a Msg B, or a four-step RACH procedure based on a Msg 1 and a Msg 3 or a Msg 2 and a Msg 4.

Aspect 18 may be combined with any of aspects 11-17 and is characterized in that the at least one RACH message and the DL information are at least one of FDMed or SDMed.

Aspect 19 may be combined with any of aspects 11-18 and is characterized in that each of the UL beam and the DL beam correspond to at least one of a fully overlapped frequency band, a partially overlapped frequency band, or a non-overlapped frequency band.

Aspect 20 may be combined with any of aspects 11-19 and is characterized in that the configuration for the beam pair including the UL beam and the DL beam is transmitted via at least one of DCI, RRC signaling, or a MAC-CE.

Aspect 21 is a method of wireless communication of a UE, characterized by:
transmitting a RACH preamble based on a first mode of transmission of a plurality of modes of transmission; determining to retransmit the RACH preamble based on a threshold time delay measured from the transmission of the RACH preamble; and retransmitting the RACH preamble based on a second mode of transmission of the plurality of modes of transmission, the second mode of transmission being a same mode or a different mode of transmission from the first mode of transmission, each mode of transmission of the plurality of modes of transmission based on one or more of TDM, FDM, or SDM.

Aspect 22 may be combined with aspect 21 and is characterized in that the RACH preamble is retransmitted in one or more retransmissions based on the plurality of modes of transmission.

Aspect 23 may be combined with any of aspects 21-22 and is further characterized by determining the first mode of transmission of the RACH preamble and each mode of transmission of the one or more retransmissions of the RACH preamble based on an implementation of the UE.

Aspect 24 may be combined with any of aspects 21-22 and is further characterized by determining the first mode of transmission of the RACH preamble based on an implementation of the UE; and determining each mode of transmission of the one or more retransmissions of the RACH preamble based on at least one of signaling from a base station or a predefined protocol.

Aspect 25 may be combined with any of aspects 21-22 or 24 and is characterized in that a last retransmission of the one or more retransmissions of the RACH preamble is based on TDM.

Aspect 26 may be combined with any of aspects 21-22 and is further characterized by determining the first mode of transmission of the RACH preamble and each mode of transmission of the one or more retransmissions of the RACH preamble based on at least one of signaling from a base station or a predefined protocol.

Aspect 27 may be combined with any of aspects 21-26 and is further characterized by receiving a RRC configuration for a maximum number of retransmissions of the RACH preamble.

Aspect 28 is a method of wireless communication of a base station, comprising:
receiving a transmission of a RACH preamble based on a first mode of transmission of a plurality of modes of transmission; and receiving a retransmission of the RACH preamble based on a second mode of transmission of the plurality of modes of transmission, the second mode of transmission being a same mode or a different mode of transmission from the first mode of transmission, each mode of transmission of the plurality of modes of transmission based on one or more of TDM, FDM, or SDM.

Aspect 29 may be combined with aspect 28 and is characterized in that the retransmission of the RACH preamble is received via one or more retransmissions based on the plurality of modes of transmission.

Aspect 30 may be combined with any of aspects 28-29 and is characterized in that the first mode of transmission of the RACH preamble and each mode of transmission of the one or more retransmissions of the RACH preamble is determined based on an implementation of a UE.

Aspect 31 may be combined with any of aspects 28-29 and is characterized in that the first mode of transmission of the RACH preamble is determined based on an implementation of a UE and each mode of transmission of the one or more retransmissions of the RACH preamble is determined based on at least one of signaling from the base station or a predefined protocol.

Aspect 32 may be combined with any of aspects 28-29 or 31 and is characterized in that a last retransmission of the one or more retransmissions of the RACH preamble is based on TDM.

Aspect 33 may be combined with any of aspects 28-29 and is characterized in that the first mode of transmission of the RACH preamble and each mode of transmission of the one or more retransmissions of the RACH preamble is determined based on at least one of signaling from the base station or a predefined protocol.

Aspect 34 may be combined with any of aspects 28-33 and is further characterized by transmitting a RRC configuration for a maximum number of retransmissions of the RACH preamble.

Aspect 35 is an apparatus for wireless communication including at least one processor coupled to a memory and configured to implement a method as in any of aspects 1-34.

Aspect 36 is an apparatus for wireless communication including means for implementing a method as in any of aspects 1-34.

Aspect 37 is a computer-readable medium storing computer executable code, where the code when executed by a processor causes the processor to implement a method as in any of aspects 1-34.

What is claimed is:
1. A method of wireless communication of a user equipment (UE), comprising:

receiving, from at least one of a first base station or a first transmission-reception point (TRP), a configuration for a beam pair including an uplink (UL) beam and a downlink (DL) beam; and transmitting at least one random access channel (RACH) message of a RACH procedure via the UL beam while receiving DL information via the DL beam at a same time, at least one of the UE or the at least one of the first base station or the first TRP operating in a full duplex (FD) mode, wherein the at least one RACH message is transmitted via the UL beam to at least one of a second base station or a second TRP that is different from the at least one of the first base station or the first TRP.

2. The method of claim 1, wherein the at least one RACH message is transmitted via the UL beam to the at least one of the first base station or the first TRP.

3. The method of claim 2, wherein the DL information is based on at least one of a synchronization signal block (SSB), a physical downlink control channel (PDCCH), a physical downlink shared channel (PDSCH), or a channel state information-reference signal (CSI-RS).

4. The method of claim 1, wherein the at least one RACH message corresponds to at least one of a beam failure recovery (BFR) or a physical downlink control channel (PDCCH) order.

5. The method of claim 1, wherein the at least one RACH message includes a first portion corresponding to a preamble portion or a control portion and a second portion corresponding to a payload portion, and wherein transmitting the at least one RACH message further comprises one of:
   transmitting the first portion in the FD mode and the second portion in a half-duplex (HD) mode;
   transmitting the first portion in the HD mode and the second portion in the FD mode;
   transmitting the first portion and the second portion in the FD mode; or
   transmitting the first portion and the second portion in the HD mode.

6. The method of claim 5, wherein the RACH procedure is at least one of a two-step RACH procedure based on a message (Msg) A or a Msg B, or a four-step RACH procedure based on a Msg 1 and a Msg 3 or a Msg 2 and a Msg 4.

7. The method of claim 1, wherein the at least one RACH message and the DL information are at least one of frequency division multiplexed (FDMed) or spatial division multiplexed (SDMed).

8. The method of claim 1, wherein each of the UL beam and the DL beam correspond to at least one of a fully overlapped frequency band, a partially overlapped frequency band, or a non-overlapped frequency band.

9. The method of claim 1, wherein the configuration for the beam pair including the UL beam and the DL beam is received via at least one of downlink control information (DCI), radio resource control (RRC) signaling, or a medium access control-control element (MAC-CE).

10. A method of wireless communication of a base station, comprising:
   transmitting, to at least one of a first user equipment (UE) or a first transmission-reception point (TRP), a configuration for a beam pair including an uplink (UL) beam and a downlink (DL) beam; and
   receiving at least one random access channel (RACH) message of a RACH procedure via the UL beam while transmitting DL information via the DL beam at a same time, at least one of the base station or the at least one of the first UE or the first TRP operating in a full duplex (FD) mode, wherein the at least one RACH message is received via the UL beam from at least one of a second UE or a second TRP that is different from the at least one of the first UE or the first TRP.

11. The method of claim 10, wherein the at least one RACH message is received via the UL beam from the at least one of the first UE or the first TRP.

12. The method of claim 11, wherein the DL information is based on at least one of a synchronization signal block (SSB), a physical downlink control channel (PDCCH), a physical downlink shared channel (PDSCH), or a channel state information-reference signal (CSI-RS).

13. The method of claim 10, wherein the at least one RACH message corresponds to at least one of a beam failure recovery (BFR) or a physical downlink control channel (PDCCH) order.

14. The method of claim 10, wherein the at least one RACH message includes a first portion corresponding to a preamble portion or a control portion and a second portion corresponding to a payload portion, and wherein receiving the at least one RACH message further comprises one of:
   receiving the first portion in the FD mode and the second portion in a half-duplex (HD) mode;
   receiving the first portion in the HD mode and the second portion in the FD mode;
   receiving the first portion and the second portion in the FD mode; or
   receiving the first portion and the second portion in the HD mode.

15. The method of claim 14, wherein the RACH procedure is at least one of a two-step RACH procedure based on a message (Msg) A or a Msg B, or a four-step RACH procedure based on a Msg 1 and a Msg 3 or a Msg 2 and a Msg 4.

16. The method of claim 10, wherein the at least one RACH message and the DL information are at least one of frequency division multiplexed (FDMed) or spatial division multiplexed (SDMed).

17. The method of claim 10, wherein each of the UL beam and the DL beam correspond to at least one of a fully overlapped frequency band, a partially overlapped frequency band, or a non-overlapped frequency band.

18. The method of claim 10, wherein the configuration for the beam pair including the UL beam and the DL beam is transmitted via at least one of downlink control information (DCI), radio resource control (RRC) signaling, or a medium access control-control element (MAC-CE).

19. An apparatus for wireless communication of a user equipment (UE), comprising:
   a memory; and
   at least one processor coupled to the memory and configured to:
      receive, from at least one of a first base station or a first transmission-reception point (TRP), a configuration for a beam pair including an uplink (UL) beam and a downlink (DL) beam; and
      transmit at least one random access channel (RACH) message of a RACH procedure via the UL beam while receiving DL information via the DL beam at a same time, at least one of the UE or the at least one of the first base station or the first TRP operating in a full duplex (FD) mode, wherein the at least one processor is configured to transmit the at least one RACH message via the UL beam to at least one of a second base station or a second TRP that is different from the at least one of the first base station or the first TRP.

20. The apparatus of claim 19, wherein the at least one RACH message is transmitted via the UL beam to the at least one of the first base station or the first TRP.

21. The apparatus of claim 20, wherein the DL information is based on at least one of a synchronization signal block (SSB), a physical downlink control channel (PDCCH), a physical downlink shared channel (PDSCH), or a channel state information-reference signal (CSI-RS).

22. The apparatus of claim 19, wherein the at least one RACH message includes a first portion corresponding to a preamble portion or a control portion and a second portion corresponding to a payload portion, and wherein to transmit the at least one RACH message the at least one processor is further configured to:
   transmit the first portion in the FD mode and the second portion in a half-duplex (HD) mode;
   transmit the first portion in the HD mode and the second portion in the FD mode;
   transmit the first portion and the second portion in the FD mode; or
   transmit the first portion and the second portion in the HD mode.

23. An apparatus for wireless communication of a base station, comprising:
   a memory; and
   at least one processor coupled to the memory and configured to:
      transmit, to at least one of a first user equipment (UE) or a first transmission-reception point (TRP), a configuration for a beam pair including an uplink (UL) beam and a downlink (DL) beam; and
      receive at least one random access channel (RACH) message of a RACH procedure via the UL beam while transmitting DL information via the DL beam at a same time, at least one of the base station or the at least one of the first UE or the first TRP operating in a full duplex (FD) mode, wherein the at least one processor is configured to receive the at least one RACH message via the UL beam from at least one of a second UE or a second TRP that is different from the at least one of the first UE or the first TRP.

24. The apparatus of claim 23, wherein the at least one RACH message is received via the UL beam from the at least one of the first UE or the first TRP.

25. The apparatus of claim 24, wherein the DL information is based on at least one of a synchronization signal block (SSB), a physical downlink control channel (PDCCH), a physical downlink shared channel (PDSCH), or a channel state information-reference signal (CSI-RS).

26. The apparatus of claim 23, wherein the at least one RACH message includes a first portion corresponding to a preamble portion or a control portion and a second portion corresponding to a payload portion, and wherein to receive the at least one RACH message the at least one processor is further configured to:
   receive the first portion in the FD mode and the second portion in a half-duplex (HD) mode;
   receive the first portion in the HD mode and the second portion in the FD mode;
   receive the first portion and the second portion in the FD mode; or
   receive the first portion and the second portion in the HD mode.

* * * * *